US012742287B2

(12) United States Patent
Kawamura

(10) Patent No.: US 12,742,287 B2
(45) Date of Patent: Sep. 22, 2026

(54) FABRIC TREATMENT AGENT, TEXTILE PRINTING INK SET, PRETREATED FABRIC, TEXTILE PRINTING METHOD, AND TEXTILE PRINTED FABRIC

(71) Applicant: KONICA MINOLTA, INC., Tokyo (JP)

(72) Inventor: Ayumi Kawamura, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 292 days.

(21) Appl. No.: 18/536,397

(22) Filed: Dec. 12, 2023

(65) Prior Publication Data

US 2024/0240393 A1 Jul. 18, 2024

(30) Foreign Application Priority Data

Jan. 11, 2023 (JP) ................................ 2023-002258

(51) Int. Cl.
*D06P 5/28* (2006.01)
*B41J 2/21* (2006.01)
(Continued)

(52) U.S. Cl.
CPC ............ *D06P 5/006* (2013.01); *B41J 2/2107* (2013.01); *B41J 2/2114* (2013.01);
(Continued)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623;
(Continued)

(56) References Cited

U.S. PATENT DOCUMENTS

2003/0118786 A1* 6/2003 Li ............................ D06P 5/30 428/195.1
2015/0062265 A1* 3/2015 Omori .................... B41J 2/2107 106/18.33
(Continued)

FOREIGN PATENT DOCUMENTS

JP S5266786 A 6/1977
JP H07216763 A 8/1995
(Continued)

OTHER PUBLICATIONS

Office Action (Notice of Reasons for Refusal) issued on Feb. 3, 2026, by the Japanese Patent Office in corresponding Japanese Patent Application No. 2023-002258, and a machine English Translation of the Office Action. (14 pages).

*Primary Examiner* — Manish S Shah
(74) *Attorney, Agent, or Firm* — BUCHANAN INGERSOLL & ROONEY PC

(57) ABSTRACT

A fabric treatment agent for use in textile printing by a sublimable color material, including an aromatic heterocyclic compound, wherein a molecular weight A of the aromatic heterocyclic compound satisfies the following relational formula (1).

$100 \leq A \leq 1000$ Relational formula (1):

21 Claims, 1 Drawing Sheet

(51) Int. Cl.

| | |
|---|---|
| ***C09D 11/037*** | (2014.01) |
| ***C09D 11/328*** | (2014.01) |
| ***C09D 11/38*** | (2014.01) |
| ***C09D 11/40*** | (2014.01) |
| ***C09D 11/54*** | (2014.01) |
| ***D06P 1/92*** | (2006.01) |
| ***D06P 3/60*** | (2006.01) |
| ***D06P 5/00*** | (2006.01) |

(52) U.S. Cl.
CPC .......... *C09D 11/037* (2013.01); *C09D 11/328* (2013.01); *C09D 11/38* (2013.01); *C09D 11/40* (2013.01); *C09D 11/54* (2013.01); *D06P 1/908* (2013.01); *D06P 5/002* (2013.01); *B41J 2/2117* (2013.01); *D06P 3/60* (2013.01)

(58) Field of Classification Search
CPC ................ B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2015/0166807 | A1* | 6/2015 | Komatsu | C08K 5/21 347/20 |
| 2016/0329505 | A1* | 11/2016 | Ikeda | C09D 11/52 |
| 2019/0100669 | A1* | 4/2019 | Murai | C09D 11/328 |
| 2019/0264384 | A1 | 8/2019 | Chung | |
| 2019/0382606 | A1* | 12/2019 | Iraqi | C09D 11/32 |
| 2020/0131390 | A1* | 4/2020 | Sakuma | C09D 11/38 |
| 2023/0045096 | A1* | 2/2023 | Kato | C09D 11/54 |

FOREIGN PATENT DOCUMENTS

| | | | |
|---|---|---|---|
| JP | 2001019681 | A | 1/2001 |
| JP | 2017203112 | A | 11/2017 |
| JP | 2019173233 | A | 10/2019 |
| JP | 2020511603 | A | 4/2020 |
| JP | 2021146584 | A | 9/2021 |
| JP | 2022073505 | A | 5/2022 |

* cited by examiner

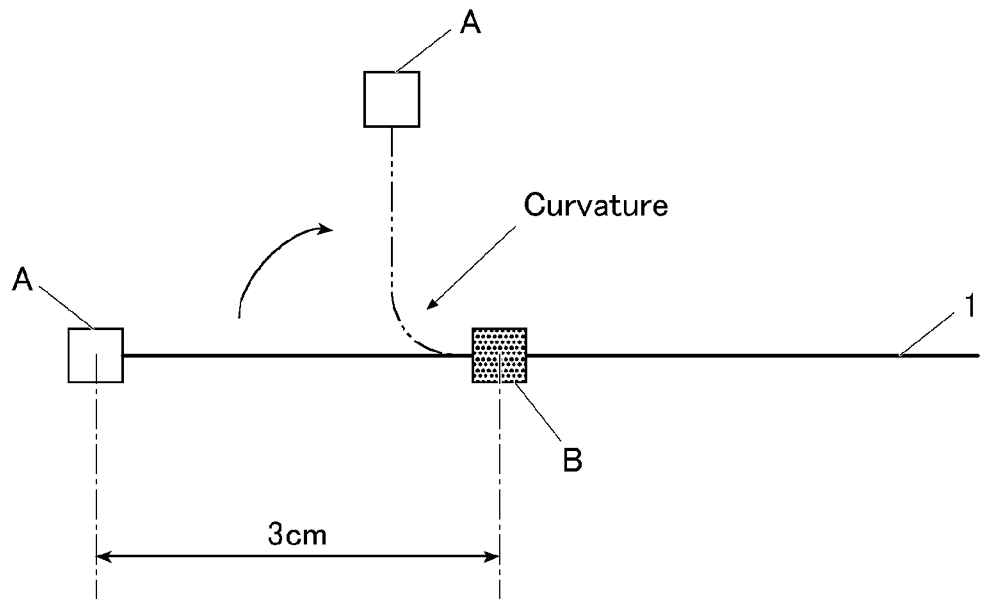
A
Curvature
A
1
B
3cm

FABRIC TREATMENT AGENT, TEXTILE PRINTING INK SET, PRETREATED FABRIC, TEXTILE PRINTING METHOD, AND TEXTILE PRINTED FABRIC

CROSS-REFERENCE TO RELATED APPLICATIONS

The entire disclosure of Japanese Patent Application No. 2023-002258 filed on Jan. 11, 2023 is incorporated herein by reference in its entirety.

BACKGROUND

Technical Field

The present invention relates to a fabric treatment agent, a textile printing ink set, a pretreated fabric, a textile printing method, and a textile printed fabric.

More specifically, the present invention relates to a fabric treatment agent and the like capable of achieving a high level of color developing ability, texture, fastness to washing, and ironing resistance of a textile printed fabric.

Description of the Related Art

Conventionally, a textile printing method for dyeing a fabric using a textile printing ink containing a sublimable color material has been known. Since the sublimable color material is generally hydrophobic, it is easily adsorbed and dyed on fabrics that also exhibit hydrophobicity. On the other hand, the sublimable color material is difficult to penetrate into fibers for fabrics exhibiting hydrophilicity, and it is difficult to dye to such an extent that it exhibits the color developing ability satisfactory. In addition, because the sublimable color material was difficult to penetrate into the fibers of fabrics, textile printing for fabrics exhibiting hydrophilicity tended to have poor fastness to washing and ironing resistance of fabrics after textile printing, even if they could be dyed.

In the technique described in JP H07-216763A, dyeability is improved by applying a swelling agent (polyhydric alcohols) to a cellulose-based fabric (a fabric exhibiting hydrophilicity) before dyeing. Further, in the technique, by applying a resin to the fabric after dyeing to seal and fix the coloring material, the dyed coloring material is prevented from migrating from the fabric to the outside. In the technique, the color developing ability of the fabric is improved, but the texture of the fabric is greatly deteriorated because the coloring material is sealed and fixed by using a resin.

In the technique described in JP 2022-073505A, a compound having a polyvalent carbodiimide group and an aromatic carboxylic acid are applied to a fabric before dyeing in order to facilitate dyeing of a fabric containing fibers having a hydroxy group (a fabric exhibiting hydrophilicity). Therefore, the technique introduces an aromatic ring that easily adsorbs a coloring material into the fibers of the fabric, and as a result, improves dyeability and thus color developing ability. In the case of the technology, the texture of the fabric is not deteriorated because no resin is used, but the color developing ability cannot be sufficiently improved. In addition, the technology cannot sufficiently improve the fastness to washing and the ironing resistance of the fabric.

As described above, several textile printing techniques have been known to improve the color developing ability of fabrics. However, there has been no textile printing technique capable of achieving a high level of color developing ability, texture, fastness to washing, and ironing resistance of fabrics (particularly fabrics exhibiting hydrophilicity).

SUMMARY

The present invention has been made in view of the above problems and situations, and an object of the present invention is to provide a fabric treatment agent, a textile printing ink set, a pretreated fabric, and a textile printing method, capable of achieving a high level of color developing ability, texture, fastness to washing, and ironing resistance of a textile printed fabric, and a textile printed fabric achieving a high level of color developing ability, texture, fastness to washing, and ironing resistance.

In order to solve the above problems, the present inventor has studied causes and the like of the above problems. As a result, the present inventor has found that the above problems can be solved by using a fabric treatment agent including an aromatic heterocyclic compound having a molecular weight satisfying a specified condition.

That is, the above problems according to the present invention is solved by the following means.

To achieve at least one of the abovementioned objects, according to an aspect of the present invention, a fabric treatment agent reflecting one aspect of the present invention is a fabric treatment agent for use in textile printing by a sublimable color material, including an aromatic heterocyclic compound, wherein a molecular weight A of the aromatic heterocyclic compound satisfies the following relational formula (1).

$$100 \leq A \leq 1000 \qquad \text{Relational formula(1)}$$

To achieve at least one of the abovementioned objects, according to an aspect of the present invention, a pretreated fabric reflecting one aspect of the present invention is a pretreated fabric for use in textile printing by a sublimable color material, including an aromatic heterocyclic compound, wherein a molecular weight A of the aromatic heterocyclic compound satisfies the following relational formula (1).

$$100 \leq A \leq 1000 \qquad \text{Relational formula(1)}$$

To achieve at least one of the abovementioned objects, according to an aspect of the present invention, a textile printing method reflecting one aspect of the present invention is a textile printing method including dyeing a fabric with a sublimable color material in the presence of an aromatic heterocyclic compound, wherein a molecular weight A of the aromatic heterocyclic compound satisfies the following relational formula (1).

$$100 \leq A \leq 1000 \qquad \text{Relational formula(1)}$$

To achieve at least one of the abovementioned objects, according to an aspect of the present invention, a textile printed fabric reflecting one aspect of the present invention is a textile printed fabric including an aromatic heterocyclic compound and a sublimable color material, wherein a molecular weight A of the aromatic heterocyclic compound satisfies the following relational formula (1).

$$100 \leq A \leq 1000 \quad \text{Relational formula(1)}$$

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein FIG. 1 is an explanation drawing of the bending test.

DETAILED DESCRIPTION

Hereinafter, one or more embodiments of the present invention will be described with reference to the drawings. However, the scope of the invention is not limited to the disclosed embodiments.

The fabric treatment agent of the present invention is a fabric treatment agent for use in textile printing by a sublimable color material, including an aromatic heterocyclic compound, wherein a molecular weight A of the aromatic heterocyclic compound satisfies the above relational formula (1).

This feature is a technical feature common to or corresponding to the embodiments described below.

In an embodiment of the fabric treatment agent of the present invention, it is preferable that the molecular weight A of the aromatic heterocyclic compound and a molecular weight B of the sublimable color material satisfy the following relational formula (2), relational formula (2): $350 \leq A+B$. When A+B is not too small, the sublimable color material adsorbed with the aromatic heterocyclic compound is less likely to sublime, so that the ironing resistance of the fabric can be further improved.

In an embodiment of the fabric treatment agent of the present invention, it is preferable that the molecular weight A of the aromatic heterocyclic compound and the molecular weight B of the sublimable color material satisfy the following relational formula (3), relational formula (3): $A+B \leq 1500$. When A+B is not too large, it is possible to achieve both color developing ability and texture of the fabric at a higher level.

In an embodiment of the fabric treatment agent of the present invention, it is preferable that the fabric treatment agent further contains a solvent having a ratio of an inorganic value of the solvent to an organic value of the solvent (I/O) in the range of 1 or more and 3 or less. This makes it easier for the solvent to interact with both hydrophilic fibers and hydrophobic sublimable color material because the solvent has a hydrophilic portion and a hydrophobic portion, moderately. As a result, the fibers of the fabric are easily swollen by the solvent, and furthermore, a sublimable color material, an aromatic heterocyclic compound, or the like can be easily introduced into the fibers.

In an embodiment of the fabric treatment agent of the present invention, it is preferable that the aromatic heterocyclic compound has three or more aromatic rings. This increases the aromaticity of the aromatic heterocyclic compound, thus enhancing the $\pi$-$\pi$ interaction with the sublimable color material. As a result, a coloring material capturing force of the aromatic heterocyclic compound is improved, so that the color developing ability, the fastness to washing, and the ironing resistance of the fabric can be further improved.

In an embodiment of the fabric treatment agent of the present invention, it is preferable that the aromatic heterocyclic compound has 5 or more aromatic rings. This increases the aromaticity of the heteroaromatic compound, thus enhancing the $\pi$-$\pi$ interaction with the sublimable color material. As a result, a coloring material capturing force of the aromatic heterocyclic compound is improved, so that the color developing ability, the fastness to washing, and the ironing resistance of the fabric can be further improved.

In an embodiment of the fabric treatment agent of the present invention, it is preferable that the molecular weight A of the aromatic heterocyclic compound satisfies the following relational formula (1'), relational formula (1'): $200 \leq A \leq 600$. As a result, the color developing ability, the fastness to washing, and the ironing resistance of the fabric can be further improved.

In an embodiment of the fabric treatment agent of the present invention, it is preferable that the molecular weight A of the aromatic heterocyclic compound and the molecular weight B of the sublimable color material satisfy the following relational formula (2'), relational formula (2'): $450 \leq A+B$. When A+B is not too small, the sublimable color material adsorbed with the aromatic heterocyclic compound is less likely to sublime, so that the ironing resistance of the fabric can be further improved.

In an embodiment of the fabric treatment agent of the present invention, it is preferable that the molecular weight A of the aromatic heterocyclic compound and the molecular weight B of the sublimable color material satisfy the following relational formula (3'), relational formula (3'): $A+B \leq 1200$. When A+B is not too large, it is possible to achieve both color developing ability and texture of the fabric at a higher level.

A textile printing ink set of the present invention includes a textile printing ink containing a sublimable color material and a fabric treatment agent, wherein the fabric treatment agent is the fabric treatment agent of the present invention.

A pretreated fabric of the present invention is a pretreated fabric for use in textile printing by a sublimable color material, including an aromatic heterocyclic compound, wherein a molecular weight B of the sublimable color material and a molecular weight A of the aromatic heterocyclic compound satisfy the above relational formula (1).

A textile printing method of the present invention is a textile printing method for dyeing a fabric with a sublimable color material in the presence of an aromatic heterocyclic compound, wherein a molecular weight A of the aromatic heterocyclic compound satisfies the relation above relational formula (1).

In an embodiment of the textile printing method of the present invention, it is preferable that the molecular weight A of the aromatic heterocyclic compound and a molecular weight B of the sublimable color material satisfy the above relational formula (2). When A+B is not too small, the sublimable color material adsorbed with the aromatic heterocyclic compound is less likely to sublime, so that the ironing resistance of the fabric can be further improved.

In an embodiment of the textile printing method of the present invention, it is preferable that the molecular weight A of the aromatic heterocyclic compound and the molecular weight B of the sublimable color material satisfy the above relational formula (3). When A+B is not too large, it is possible to achieve both color developing ability and texture of the fabric at a higher level.

In an embodiment of the textile printing method of the present invention, it is preferable that the fabric contains natural fibers or synthetic cellulose fibers because the effects of the present invention can be remarkably exhibited.

In an embodiment of the textile printing method of the present invention, it is preferable that the dyeing method is a dye sublimation transfer method from the viewpoint of exhibiting the effects of the present invention.

A textile printed fabric of the present invention including an aromatic heterocyclic compound and a sublimable color material, wherein a molecular weight A of the aromatic heterocyclic compound satisfies the above relational formula (1).

In an embodiment of the textile printed fabric of the present invention, it is preferable that the molecular weight A of the aromatic heterocyclic compound and a molecular weight B of the sublimable color material satisfy the above relational formula (2). When A+B is not too small, the sublimable color material adsorbed with the aromatic heterocyclic compound is less likely to sublime, so that the ironing resistance of the fabric can be further improved.

In an embodiment of the textile printed fabric of the present invention, it is preferable that the molecular weight A of the aromatic heterocyclic compound and the molecular weight B of the sublimable color material satisfy the above relational formula (3). When A+B is not too large, it is possible to achieve both color developing ability and texture of the fabric at a higher level.

Hereinafter, the present invention, its constituent elements, and embodiments and aspects for carrying out the present invention will be described in detail. In the present application, "to" is used in the meaning that numerical values described before and after are included as a lower limit value and an upper limit value.

<1 Fabric Treatment Agent>

The fabric treatment agent of the present invention is a fabric treatment agent for use in textile printing by a sublimable color material, including an aromatic heterocyclic compound, wherein the molecular weight A of the aromatic heterocyclic compound satisfies the following relational formula (1).

$$\text{Relational formula (1): } 100 \leq A \leq 1000$$

The molecular weight A of the aromatic heterocyclic compound preferably satisfies the following relational formula (1'). As a result, the color developing ability, the fastness to washing, and the ironing resistance of the fabric can be further improved.

$$\text{Relational formula (1'): } 200 \leq A \leq 600$$

The apparent molecular weight A+B obtained by adding up the molecular weight A of the aromatic heterocyclic compound and the molecular weight B of the sublimable color material preferably satisfies the following relational formula (2), and more preferably satisfies the following relational formula (2'). When A+B is not too small, the sublimable color material adsorbed with the aromatic heterocyclic compound is less likely to sublime, so that the ironing resistance of the fabric can be further improved.

$$\text{Relational formula (2): } 350 \leq A+B$$

$$\text{Relational formula (2'): } 450 \leq A+B$$

The apparent molecular weight A+B obtained by adding up the molecular weight A of the aromatic heterocyclic compound and the molecular weight B of the sublimable color material preferably satisfies the following relational formula (3), and more preferably satisfies the following relational formula (3'). When A+B is not too large, the molecular weight of the sublimable color material as well as the aromatic heterocyclic compound is not too large, so that the sublimable color material easily penetrates into the fiber. Accordingly, the color developing ability of the fabric can be further improved. In addition, when A+B is not too large, it is possible to suppress the presence of the sublimable color material and the aromatic heterocyclic compound having a large apparent molecular weight so as to overlap each other on the surface of the fiber. Therefore, it is difficult to deteriorate the texture of the fabric. Therefore, when A+B is not too large, it is possible to achieve both color developing ability and texture of the fabric at a higher level.

$$\text{Relational formula (3): } A+B \leq 1500$$

$$\text{Relational formula (3'): } A+B \leq 1200$$

The molecular weight A and the molecular weight B are determined by Gas chromatography time-of-flight mass spectrometry using a sample cut from the textile printed fabric containing an aromatic heterocyclic compound and/or a sublimable color material. For the spectrometer, JMS-T2000GC AccuTOF GC-Alpha (High Performance Gas Chromatography Time-of-Flight Mass Spectrometer, manufactured by JEOL Ltd.) can be used. The molecular weights of the unknown components in the fabric treatment agent and the textile printed fabric can also be determined by the mass spectrometry. Note that the aromatic heterocyclic compound, the sublimable color material, and similar compounds are not high molecular weight bodies. Thus, the "molecular weight" in the present application means the molecular weight of a single compound rather than the average molecular weight.

In the present invention, the "dyeing" refers to fixing a dye to a fabric using a coloring material, the "dyeability" refers to the degree or extent of the fixation of a dye, the "color development" refers to the coloring of a fabric to the desired color with a coloring material, and the "color developing ability" refers to the degree or extent of the coloring to the desired color.

<1.1 Aromatic Heterocyclic Compounds>

The fabric treatment agent of the present invention includes an aromatic heterocyclic compound.

In the present invention, the "aromatic heterocyclic compound" refers to a compound having an aromatic ring (an aromatic heterocyclic ring) composed of a carbon atom and a heteroatom other than a carbon atom. An aromatic ring in which only a carbon atom constitutes the aromatic ring and a heteroatom is contained only in a substituent contained in the aromatic ring does not fall under the aromatic heterocyclic ring.

From the viewpoint of a coloring material capturing force, the heteroatom constituting the aromatic heterocyclic ring is preferably an oxygen atom, a nitrogen atom, or a sulfur atom, and more preferably a nitrogen atom.

The aromatic heterocyclic ring may be a monocyclic ring or a condensed ring.

Examples of the aromatic heterocyclic ring include pyrazol rings, triazol rings, imidazole rings, triazine rings, pyridine rings, pyrazol rings, aridine rings, indole rings, quinoline rings, pyrrole rings, thiophene rings, and the like. Of these, pyrazole rings, triazole rings, or imidazole rings are preferable from the viewpoint of the coloring material capturing force.

The aromatic heterocyclic ring may further have a substituent. Examples of the substituent include alky groups, alkenyl groups, hydroxy groups, alkoxy groups, alkylester groups, alkylether groups, carboxy groups, acyl groups, amino groups, imino groups, cyano groups, nitro groups, halogeno groups, and the like.

The aromatic heterocyclic compound preferably has three or more aromatic rings, and more preferably has five or more aromatic rings. Further, it is preferable to have a structure in which two aromatic rings are bonded to each other by a single bond as a part or the whole. When the aromatic compound has these structures, the aromaticity becomes higher, and thus the π-π interaction with a sublimable color material becomes stronger. As a result, a coloring material capturing force of the aromatic heterocyclic compound is improved, so that the color developing ability, the fastness to washing (wash fastness), and the ironing resistance of the fabric can be further improved.

The aromatic heterocyclic compound according to the present invention is exemplified. The aromatic heterocyclic compound according to the present invention is not limited thereto.

Compound (1)

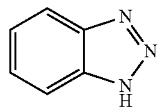

Compound (2)

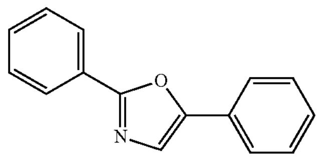

Compound (3)

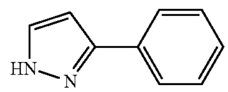

Compound (4)

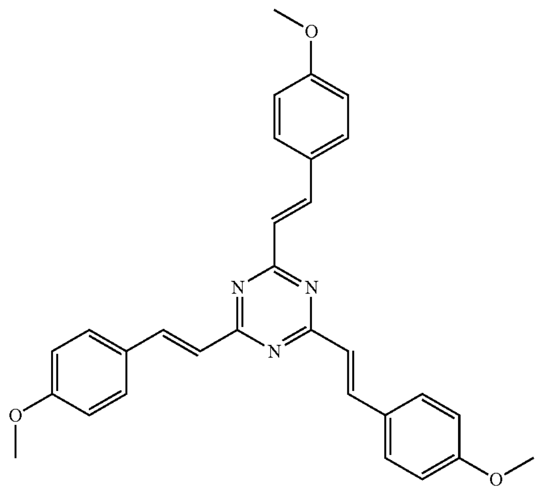

Compound (5)

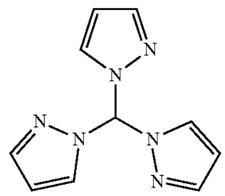

Compound (6)

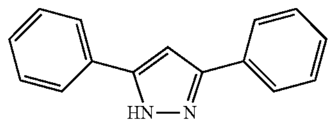

Compound (7)

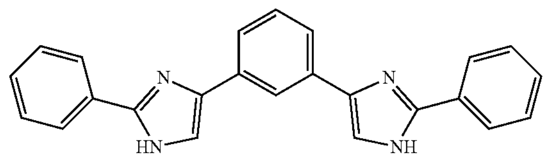

Compound (8)

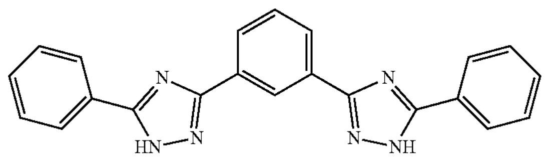

-continued

Compound (9)

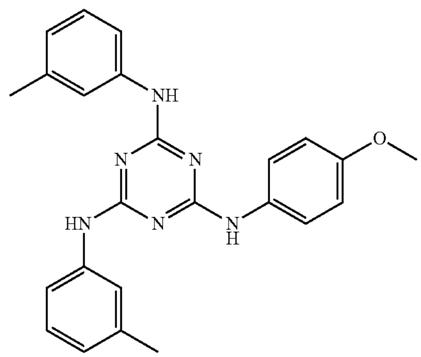

Compound (10)

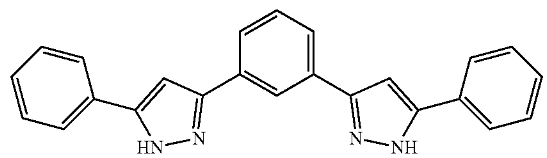

Compound (11)

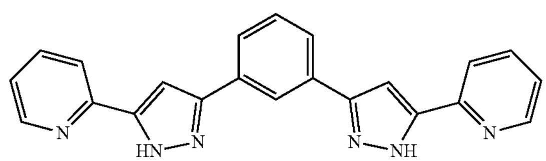

Compound (12)

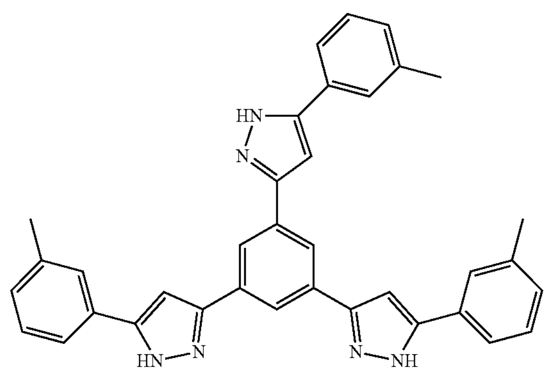

Compound (13)

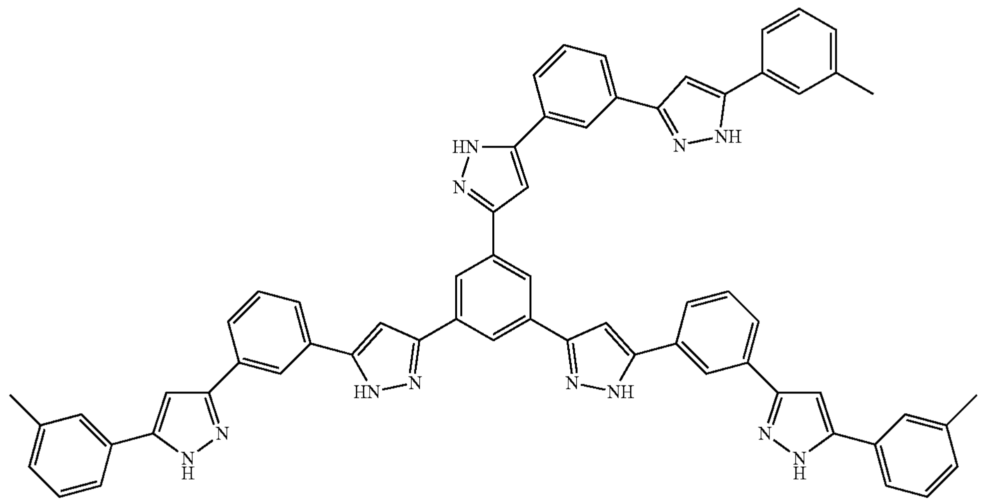

From the viewpoint of the coloring material capturing force, the aromatic heterocyclic compound according to the present invention is preferably contained in the range of 1% by mass or more and 30% by mass or less, and more preferably in the range of 10% by mass or more and 20% by mass or less, based on the entire fabric treatment agent.

<1.2 Solvent>

The fabric treatment agent of the present invention may contain a solvent. The solvent preferably has a property of swelling fibers of a fabric (swelling property) and a property of dissolving a sublimable color material (color material solubility). By containing such a solvent, a sublimable color material, an aromatic heterocyclic compound, or the like can be carried deeper into the fibers. As a result, the color developing ability, the fastness to washing, and the ironing resistance of the fabric can be further improved.

Examples of the solvent that fabric treatment agent may contain include:

Dipropylene glycol dimethyl ether (I/O: 0.38),
Dipropylene glycol monomethyl ether (I/O: 1.00),
2-pyrrolidone (I/O: 1.15),
Ethylene glycol monoethylene ether (I/O: 1.5),
Dimethyl sulfoxide (I/O: 1.75),
Butyric acid (I/O: 1.875),
Polyethylene glycol (I/O: 2.0),
Isobutyric acid (I/O: 2.143),
2,3-butanediol (I/O: 2.5),
Trimethylolethane (I/O: 3.0), Propylene glycol (I/O: 3.3),
Polypropylene glycol (I/O: 3.3), and
Ethylene glycol (I/O: 5.0).

The "I/O" is a value of the ratio between an inorganic value (I) and an organic value (O) (inorganic value/organic value). I/O is also referred to as Inorganic Organic Balance (IOB), and is one of the index indicating the magnitude of the polarity of the compound.

I/O is explained in detail in publications such as Organic conceptual diagram (by Yoshio Koda, Sankyo Shuppan Co., Ltd. (1984)); KUMAMOTO PHARMACEUTICAL BULLETIN, No. 1, items 1 to 16 (1954); and Area of chemistry, Vol. 11, No. 10, items 719 to 725 (1957).

The "inorganic value (I)" is a value obtained by quantifying the magnitude of the influence on the boiling point of various substituents, bonds, or the like of the organic compound based on the hydroxy group. Specifically, the distance between the boiling point curve of the linear alcohol and the boiling point curve of the linear paraffin is about 100° C. if taken in the vicinity of the carbon number of 5, so the influence of one hydroxy group is numerically determined as 100. The value obtained by quantifying the influence on the boiling point of various substituents or various bonds on the basis of this value is an inorganic value (I). For example, the inorganic value (I) of the carboxy group (—COOH) is 150 and the inorganic value (I) of the double bond is 2. The inorganic value (I) of a certain organic compound means the sum of the inorganic values (I) of various substituents, bonds, or the like of the organic compound.

The "organic value (O)" is defined based on the methylene group in a molecule as a unit and the influence on the boiling point of a carbon atom representing the methylene group. Specifically, the average value of the boiling point rise caused by the addition of one carbon atom in the vicinity of the carbon number of 5 to 10 of the linear saturated hydrocarbon compound is 20° C., so the organic value of one carbon atom is determined as 20 on the basis of this value. The value obtained by quantifying the influence on the boiling point of various substituents or various bonds on the basis of this value is an organic value (O). For example, the organic property (O) of the nitro group (—$NO_2$) is 70. The organic value (O) of a certain organic compound means the sum of the organic values (O) of various substituents, bonds, or the like of the organic compound.

Generally, I/O indicates that the smaller the value, the more nonpolar (more hydrophobic, more organic), and the larger the value, the more polar (more hydrophilic, more inorganic).

I/O of the solvent is preferably in the range of 1 or more and 3 or less. This makes it easier for the solvent to interact with both hydrophilic fibers and hydrophobic sublimable color material because the solvent has a hydrophilic portion and a hydrophobic portion, moderately. As a result, the fibers of the fabric are easily swollen by the solvent, and furthermore, a sublimable color material, an aromatic compound, or the like can be easily introduced into the fibers.

In the fabric treatment agent, the solvent is preferably contained in the range of 5% by mass or more and 95% by mass or less, and more preferably in the range of 50% by mass or more and 80% by mass or less, with respect to the entire fabric treatment agent.

<1.3 Other Components>

The fabric treatment agent of the present invention may further contain other components other than those described above, if necessary. Examples of other components include water, surfactants, preservatives, pH modifiers, UV absorbers, and antioxidants.

Examples of water include ion-exchanged water, distilled water, and pure water. The content of water in the fabric treatment agent is preferably in the range of 0% by mass or more and 95% by mass or less, and more preferably in the range of 0% by mass or more and 50% by mass or less.

The surfactant is not particularly limited. However, when an anionic compound is contained in the constituent components of the ink, the ionic property of the surfactant is preferably anionic or nonionic. When the ionic property of the surfactant is amphoteric, it is preferably betaine-type.

Specific examples thereof include fluorine-based or silicone-based surfactants having a high-static surface tension reducing ability and a dioctyl sulfosuccinate having a high-dynamic surface tension reducing ability. Also included are anionic surfactant such as sodium dodecyl sulfate, polyoxyethylene alkyl ethers and polyoxyethylene alkyl phenyl ethers having relatively lower molecular weights, acetylene glycols, Pluronic (registered trademark) type surfactant, and nonionic surfactant such as sorbitan derivatives.

A fluorine-based or silicone-based surfactant having a high-static surface tension reducing ability and a surfactant having a high-dynamic surface tension reducing ability may be used in combination.

Examples of the preservatives include aromatic halogen compounds (e.g., PreventolCMK (manufactured by LANXESS), methylene dithiocyanate, halogen-nitrogen-containing sulfur compounds, and 1,2-Benzisothiazolin-3-one (e.g., PROXEL GXL, manufactured by Lonza).

Examples of the pH modifiers include citric acid, sodium citrate, hydrochloric acid, and sodium hydroxide.

The fabric treatment agent of the present invention may contain a resin as long as the fabric treatment agent does not inhibit the effectiveness of the present invention, but preferably does not contain a resin from the viewpoint of maintaining the texture of the fabric.

<1.4 Physical Properties of Fabric Treatment Agent>

The viscosity of the fabric treatment agent at 25° C. can be appropriately adjusted according to the applying method of the fabric and the like. For example, when the fabric treatment agent is applied by an inkjet method, the viscosity of the fabric treatment agent is preferably in the range of 4 mPa·s to 20 mPa·s. The viscosity of the fabric treatment agent can be measured at 25° C. with an E-type viscometer.

<2 Textile Printing Ink Set>

The textile printing ink set of the present invention is a textile printing ink set including a textile printing ink containing a sublimable color material and a fabric treatment agent, wherein the fabric treatment agent is a fabric treatment agent of the present invention.

The fabric treatment agent included in the textile printing ink set is as described above. The textile printing ink included in the textile printing ink set will be described below.

<3 Textile Printing Ink>

The textile printing ink included in the textile printing ink set of the present invention contains at least a sublimable color material. In addition to the sublimable color material, it may contain water, an organic solvent, a dispersing agent, and the like.

<3.1 Sublimable Color Material>

As used herein, the "sublimable color material" refers to a coloring material having a property of sublimating upon being heated.

The sublimable color material is preferably a dispersible dye which is insoluble or poorly soluble in water. Here, insoluble or poorly soluble in water means that the solubility in water at 25° C. is 10 mg/L or less, preferably 5 mg/L or less, and more preferably 1 mg/L or less.

The chemical structure of the sublimable color material is not particularly limited, but it is preferable to have a plurality of aromatic rings. When the sublimable color material has a plurality of aromatic rings, the π-π interaction between the sublimable color material and the aromatic heterocyclic compound becomes strong, and the sublimable color material is more likely to be fixed to the fabric.

Examples of the dispersible dyes of the sublimable color material include the following dyes:

- C.I. Disperse Yellow 3, 4, 5, 7, 9, 13, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 149, 160, 162, 163, 164, 165, 179, 180, 182, 183, 186, 192, 198, 199, 202, 204, 210, 211, 215, 216, 218, 224, etc.
- C.I. Disperse Orange 1, 3, 5, 7, 11, 13, 17, 20, 21, 25, 29, 30, 31, 32, 33, 37, 38, 42, 43, 44, 45, 47, 48, 49, 50, 53, 54, 55, 56, 57, 58, 59, 61, 66, 71, 73, 76, 78, 80, 89, 90, 91, 93, 96, 97, 119, 127, 130, 139, 142, etc.
- C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 289, 298, 302, 303, 310, 311, 312, 320, 324, 328, etc.
- C.I. Disperse Violet 1, 4, 8, 23, 26, 27, 28, 31, 33, 35, 36, 38, 40, 43, 46, 48, 50, 51, 52, 56, 57, 59, 61, 63, 69, 77, etc.
- C.I. Disperse Green 9, etc.
- C.I. Disperse Brown 1, 2, 4, 9, 13, 19, etc.
- C.I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, 360, etc.
- C.I. Disperse Black 1, 3, 10, 24, etc.

The molecular weight B of the sublimable color material is not particularly limited, but is preferably 200 or more. When the molecular weight B is 200 or more, the sublimable color material that has penetrated into the fibers of the fabric is less likely to be removed. More preferably, the molecular weight B is 500 or less. When the molecular weight B is 500 or less, the sublimable color material can more easily penetrate into the fibers of the fabric.

The sublimable color material contained in the textile printing ink may or may not be crystallized.

The number average particle size of the sublimable color material in the textile printing ink is not particularly limited, but may be, for example, 300 nm or less from the viewpoint of the injection stability in an inkjet method. The number average particle size of the sublimable color material can be determined by a commercially available particle size measuring apparatus using a light-scattering method, an electrophoresis method, a laser Doppler method, or the like. Examples of the particle size measuring apparatus include Zetasizer 1000 manufactured by Malvern Panalytical Ltd.

The content of the sublimable color material in the textile printing ink is not particularly limited, but is preferably in the range of 2% by mass or more and 10% by mass or less with respect to the entire textile printing ink. When the content of the sublimable color material is 2% by mass or more, high-density images can be easily formed. When the content of the sublimable color material is 10% by mass or less, the viscosity of the textile printing ink is not excessively high, so that the injection stability is hardly impaired. From the same viewpoint, the content of the sublimable color material is more preferably in the range of 5% by mass or more and 10% by mass or less with respect to the entire textile printing ink.

<3.2 Water>

Examples of water that the textile printing ink may contain include ion-exchanged water, distilled water, pure water, and the like. The content of water in the textile printing ink is preferably in the range of 40% by mass or more and 98% by mass or less, and more preferably in the range of 50% by mass or more and 70% by mass or less.

<3.3 Organic Solvent>

The organic solvent that the textile printing ink may contain is preferably a water-soluble organic solvent. The total content of water and the water-soluble organic solvent is preferably in the range of 90% by mass or more and 98% by mass or less, and more preferably in the range of 90% by mass or more and 95% by mass or less, with respect to the entire textile printing ink.

Examples of the water-soluble organic solvent include alcohols (e.g., methanol, ethanol, propanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, tripropylene glycol, polypropylene glycol, glyceline, and compounds represented by the following general formula (1)), polyvalent alcohol ethers (e.g., ethylene glycol monomethyl ether, ethylene glycol monoethyl ether, ethylene glycol monobutylether, ethylene glycol monophenyl ether, diethylene glycol monomethyl ether, diethylene glycol monoethylether, diethylene glycol monobutylether, diethylene glycol dimethylether, propylene glycol monomethyl ether, and propylene glycol monoethylether), amines (e.g., ethanolamine, N-ethyl diethanolamine, morpholine, N-ethyl morpholine, ethylenediamine, diethylenediamine, and triethylenetetramine), amides (e.g., formamide, N, N-dimethyl formamide and N, N-dimethyl acetamide), heterocycles (e.g., 2-pyrrolidone, N-methyl-2-pyrrolidone, N-cyclohexyl-2-pyrrolidone, 2-oxazolidone, and 1,3-dimethyl-2-imidazolidine), sulfoxides (e.g., dimethylsulfoxide), and sulfones (e.g., sulfolane).

General formula (1)

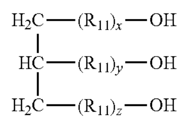

[In the general formula (1), each of Ru represents an ethylene glycol group or a propylene glycol group, x, y and z are all positive integers, and x+y+z=3 to 30.]

From the viewpoint of permeability to fabrics and injection stability in an inkjet method, it is preferable that the textile printing ink is hardly thickened upon drying. Therefore, the textile printing ink preferably contains a high boiling point solvent having a boiling point of 200° C. or higher, among water-soluble organic solvents.

Examples of the high boiling point solvent having a boiling point of 200° C. or higher include polyols and polyalkylene oxides. Examples of the polyols having a boiling point of 200° C. or higher include divalent alcohols such as 1,3-butanediol (boiling point: 208° C.), 1,6-hexanediol (boiling point: 223° C.), and polypropylene glycol; and trivalent or higher alcohols such as glycerin (boiling point: 290° C. and trimethylolpropane (boiling point: 295° C.). Examples of the polyalkylene oxides having a boiling point of 200° C. or higher include diethylene glycol monoethyl ether (boiling point: 202° C.), triethylene glycol monomethyl ether (boiling point: 245° C.), tetraethylene glycol monomethyl ether (boiling point: 305° C.), tripropylene glycol monoethyl ether (boiling point: 256° C.); and ethers of divalent alcohols such as polypropylene glycol, and ethers of trivalent or higher alcohols such as glycerin (boiling point: 290° C.) and hexanetriol.

The content of the water-soluble organic solvent is preferably in the range of 20% by mass or more and 70% by mass or less with respect to the entire textile printing ink. When the content of the water-soluble organic solvent is 20% by mass or more, the dispersibility and the injection property of the sublimable color material are more likely to be enhanced. When the content of the water-soluble organic solvent is 70% by mass or less, the drying property of the textile printing ink is not easily impaired.

<3.4 Dispersing Agent>

The dispersing agent that the textile printing ink may contain may be selected depending on the type of the sublimable color material. Examples of the dispersing agent include formalin condensate of sodium creosote oil sulfonic acid, formalin condensate of sodium cresol sulfonic acid and 2-naphthol-6-sodium sulfonate, formalin condensate of sodium cresol sulfonic acid, formalin condensate of phenol sulfonate sodium, formalin condensate of β-naphthol sulfonate sodium, formalin condensate containing β-naphthalene sulfonate sodium and β-naphthol sulfonate sodium, alkylene oxides including ethylene oxide and propylene oxide, fatty alcohols, fatty amines, fatty acids, phenols, alkylatable compounds including alkylphenols and carboxylic acid amines, lignin sulfonates, sodium paraffinsulfonate, copolymers of α-olefin and maleic anhydride, and known comb-shaped block polymers.

Examples of the comb-shaped block polymer include DISPERBYK-190, DISPERBYK-194N, DISPERBYK-2010, DISPERBYK-2015, and BYK-154, manufactured by BYK Chemie ("DISPERBYK" and "BYK" are registered trademarks of the company).

The content of the dispersing agent is not particularly limited, but is preferably in the range of 20 parts by mass or more and 200 parts by mass or less with respect to 100 parts by mass of the sublimable color material. When the content of the dispersing agent is 20 parts by mass or more, the dispersibility of the sublimable color material is more likely to be enhanced. When the content of the dispersing agent is 200 parts by mass or less, it is easy to suppress a decrease in the injection stability of the textile printing ink in an inkjet method.

<3.5 Other Components>

The textile printing ink may further include other components as needed. Examples of other components include surfactant, preservatives, pH modifiers, and the like. These may be the same as surfactant, preservatives and pH modifiers that fabric treatment agent may contain.

<3.6 Physical Properties of Textile Printing Ink>

The viscosity of the textile printing ink at 25° C. is not particularly limited as long as the injection property in an inkjet method becomes good, but is preferably in the range of 3 mPa·s or more and 20 mPa·s or less, and more preferably in the range of 4 mPa·s or more and 12 mPa·s or less. The viscosity of the textile printing ink can be measured at 25° C. with an E-type viscometer.

<3.7 Textile Printing Ink Containing Aromatic Heterocyclic Compound>

The above-described aromatic heterocyclic compounds can also be contained in a textile printing ink. By using a textile printing ink containing an aromatic heterocyclic compound, the effects of the aromatic heterocyclic compound can be obtained while eliminating the need for the fabric treatment agent and the pretreatment of the fabric therewith.

The textile printing ink containing an aromatic heterocyclic compound does not require the fabric treatment agent and the pretreatment of the fabric therewith, but can also be used for fabrics pretreated with the fabric treatment agent (pretreated fabric).

<4 Textile Printing Method>

A textile printing method of the present invention is a textile printing method for dyeing a fabric with a sublimable color material in the presence of an aromatic heterocyclic compound, wherein a molecular weight A of the aromatic heterocyclic compound satisfies the above relational formula (1).

As used herein, the term "in the presence of an aromatic heterocyclic compound" includes a case of dyeing a fabric pretreated with a fabric treatment agent containing an aromatic heterocyclic compound (pretreated fabric), and a case of dyeing with a textile printing ink containing an aromatic heterocyclic compound. In either case, the presence of an aromatic heterocyclic compound facilitates fixing of the sublimable color material to the fabric, and improves color developing ability, fastness to washing, and ironing resistance of the fabric.

<4.1 Fabric>

The fiber contained in the fabric according to the present invention is not particularly limited, and examples thereof include natural fibers (including natural cellulose fibers, hemp, wool, silk, and the like), synthetic cellulose fibers (including regeneration cellulose fibers such as rayon, and semi-synthetic cellulose fibers such as acetate), vinylon fibers, nylon fibers, acryl fibers, polyurethane fibers, polyester fibers, and the like.

The fabric preferably contains natural fibers or synthetic cellulose fibers because it can significantly exhibit the effects of the present invention. The content of the natural fibers or synthetic cellulose fibers in the fabric is more preferably 30% by mass or more. Among the natural fibers, natural cellulose fibers such as cotton fibers is particularly preferable.

The fabric may be any form of these fibers, such as woven fabrics, nonwoven fabrics, and knitted fabrics. The fabric may also be a blended woven fabric or a blended nonwoven fabric of two or more types of fibers.

<4.2 Pretreatment Step>

When dyeing a pretreated fabric (a fabric pretreated with a fabric treatment agent), the pretreated fabric can be made by a pretreatment step. In the pretreatment step, a fabric treatment agent is applied to at least a part of the fabric. The application of the fabric treatment agent to the fabric may be performed on the entire surface of the fabric, or may be selectively performed only on the areas to be dyed with a sublimable color material depending on the image to be printed.

As a method of applying a fabric treatment agent to the fabric, known methods can be used without any particular limitation. Specific examples thereof include a spraying method, a Mangle method (pad method or dipping method), a coating method, and an inkjet method. For example, in a dyeing step to be described later, from the viewpoint of being able to be continuously performed with the application of the textile printing ink containing a sublimable color material, the inkjet method is preferable, and from the viewpoint of applying a predetermined amount of the fabric treatment agent in a short time, the Mangle method and the Coater method are preferable.

In the Mangle method, the applied amount of the fabric treatment agent is adjusted by submerging the fabric in the fabric treatment agent stored in the bathtub and then wring the fabric. The temperature of the fabric treatment agent is not particularly limited, but may be 15° C. or higher and 30° C. or lower. The conditions in the inkjet method can be the same as the application of the textile printing ink in the dyeing step.

The applied amount of the fabric treatment agent is not particularly limited, and may be adjusted according to the content of the aromatic heterocyclic compound in the fabric treatment agent, the applied amount of the textile printing ink, and the like.

After the fabric treatment agent is applied to the fabric, a step of removing the solvent from a coated film of the fabric treatment agent applied to the fabric, that is, a step of drying may be performed, but it is preferable that the solvent remains. The drying method is not particularly limited, and is preferably heating by hot air, a hot plate, or a heat roller. From the viewpoint of sufficiently removing the liquid medium in a short time, heat drying is more preferable. The drying temperature is preferably in the range of 100° C. or higher and 130° C. or lower.

<4.3 Dyeing Step>

Examples of the dyeing method in the dyeing step include a dye sublimation transfer method and a direct sublimation method. In the dye sublimation transfer method, after the textile printing ink is applied to a transfer medium, the textile printing ink is transferred from the transfer medium to a fabric for dyeing. In the direct sublimation method, the textile printing ink is applied directly to the fabric for dyeing. From the viewpoint of achieving the effects of the present invention, the dye sublimation transfer method is preferable.

When dyeing a pretreated fabric, the pretreated fabric is preferably in an undried state. Specifically, a fabric treatment agent preferably remains in an amount of 20% by mass or more based on the mass of the fabric before the pretreatment. As a result, since the inside of the fiber of the fabric becomes swollen, a sublimable color material is more easily fixed, and the color developing ability, fastness to washing, and ironing resistance of the fabric are further improved.

(Dye Sublimation Transfer Method)

In dyeing with a dye sublimation transfer method, first, a textile printing ink is applied onto a transfer medium, and then dried to form an ink layer (a transfer image) corresponding to a printed image. The applying method of the textile printing ink is not particularly limited, but it is preferable to use an inkjet method because it enables highly accurate printing.

As the transfer medium used for dyeing with a dye sublimation transfer method, a transfer medium in which an ink layer can be formed on the surface of the transfer medium, and further, the ink layer can be transferred to a fabric can be used without any particular limitation. Specifically, for example, one that does not interfere with sublimation of a sublimable color material during transfer can be used as the transfer medium. As the transfer medium, for example, paper having an ink-receiving layer formed thereon with inorganic fine particles such as silica is preferable, and examples thereof include dedicated paper for inkjet use and transfer paper.

The surface of the transfer image on the transfer medium is then contacted with the surface of the fabric (including pretreated fabric) and heated (hot-pressed). Thus, a sublimable color material in the transfer image formed on the transfer medium is sublimated and transferred to the fabric, and the fabric is dyed.

The transfer temperature (hot pressing temperature) depends on the sublimation temperature of the sublimable color material, but is preferably, for example, in the range of 180° C. to 210° C. The press pressure is preferably in the range of 200 $g/cm^2$ or more and 500 $g/cm^2$ or less in the case of a flat mold, or in the range of 2 $kg/cm^2$ or more and 6 $kg/cm^2$ or less in the case of a continuous process. The press time depends on the transfer temperature and the press pressure, but is preferably in the range of 30 seconds or more and 180 seconds or less.

(Direct Sublimation Method)

In dyeing with a direct sublimation method, the fabric (including pretreated fabric) is directly applied with a textile printing ink, depending on the printed image. The applying method of the textile printing ink is not particularly limited, but it is preferable to use an inkjet method because it enables highly accurate printing. In the inkjet method, specifically, an inkjet recording device is used to eject droplets of the textile printing ink from an inkjet recording head toward a fabric.

The temperature of the surface of the fabric when the droplets of the textile printing ink land is not particularly limited, but the surface may be heated to 35° C. or higher and 70° C. or lower from the viewpoint of suppressing bleeding of the image before color development.

By heating the ink-coated film after landing, a sublimable color material is sublimated and the fabric is dyed. The heating method may be a conventionally known method, and is appropriately selected according to the type of the textile printing ink, the coloring material capturing compound, and the fabric. Examples thereof include: steaming by steam; baking by dry heat, thermosol; HT steamer by superheated steam; and hot pressing. Among them, a steaming method, a baking method, and a hot pressing method are preferable. The heating temperature is not particularly limited, but may be, for example, 95° C. or higher and less than 220° C.

<5 Pretreated Fabric>

The pretreated fabric of the present invention is a pretreated fabric for use in textile printing by a sublimable color material, including an aromatic heterocyclic compound, wherein the molecular weight A of the aromatic heterocyclic compound satisfies the above relational formula (1).

As used herein, the "pretreated fabric including an aromatic heterocyclic compound" refers to a fabric in a state in which an aromatic heterocyclic compound is physically or chemically adsorbed on the fibers contained in the fabric, or the like.

The pretreated fabric can be obtained by performing the above-described pretreatment on the fabric.

<6 Textile Printed Fabric>

The textile printed fabric of the present invention is a textile printed fabric containing an aromatic heterocyclic compound and a sublimable color material, wherein the molecular weight A of the aromatic heterocyclic compound satisfies the above relational formula (1).

In the present invention, "a textile printed fabric containing an aromatic heterocyclic compound and a sublimable color material" refers to a fabric in a state in which an aromatic heterocyclic compound and a sublimable color material are physically adsorbed or chemically adsorbed on the fibers contained in the fabric, or the like.

The textile printed fabric can be obtained by performing the above-described textile printing on the fabric. Specifically, the textile printed fabric of the present invention can be obtained by dyeing a fabric using at least one of the textile printing ink and the pretreated fabric containing an aromatic heterocyclic compound.

Example

Hereinafter, the present invention will be described in detail with reference to Examples, but the present invention is not limited thereto. In Examples below, unless otherwise specified, the process was performed at room temperature (25° C.). Unless otherwise specified, "%" and "part" mean "% by mass" and "part by mass", respectively.

[Preparation of Fabric Treatment Agent]

The components listed in Table I were mixed to prepare fabric treatment agents 1 to 11, respectively. The numerical values shown in Table I indicate the contents [% by mass] of the respective components when the total amount of the fabric treatment agent is taken as 100% by mass.

TABLE I

| Fabric treatment agent No. | | 1 | 2 | 3 | 4 | 5 | 6 | 7 | 8 | 9 | 10 | 11 |
|---|---|---|---|---|---|---|---|---|---|---|---|---|
| Resin | MD2000 (Polyester) | 50 | — | — | — | — | — | — | — | — | — | — |
| Coloring Material Capturing compound | Sodium benzoate (Molecular weight B: 144) | — | 1 | — | — | — | — | — | — | — | — | — |
| | Aromatic heterocyclic compound I (Molecular weight B: 68) | — | — | 10 | — | — | — | — | — | — | — | — |
| | Aromatic heterocyclic compound II (Molecular weight B: 1115) | — | — | — | 10 | — | — | — | — | — | — | — |
| | Aromatic heterocyclic compound III (Molecular weight B: 973) | — | — | — | — | 10 | — | — | — | — | — | — |
| | Aromatic heterocyclic compound IV (Molecular weight B: 144) | — | — | — | — | — | 10 | 10 | 10 | — | — | — |
| | Aromatic heterocyclic compound V (Molecular weight B: 220) | — | — | — | — | — | — | — | — | 10 | — | — |
| | Aromatic heterocyclic compound VI (Molecular weight B: 363) | — | — | — | — | — | — | — | — | — | 10 | — |
| | Aromatic heterocyclic compound VII (Molecular weight B: 546) | — | — | — | — | — | — | — | — | — | — | 10 |
| Organic solvents | Glycerin (I/O: 5.00) | 10 | — | — | — | — | — | — | — | — | — | — |
| | EG (I/O: 5.00) | 20 | — | — | — | — | — | — | 70 | — | — | — |
| | DPGME (I/O: 1.00) | — | — | 70 | 70 | 70 | — | — | — | — | — | — |
| | DPGDME (I/O: 0.38) | — | — | — | — | — | 70 | — | — | — | — | — |
| | DMSO (I/O: 1.75) | — | — | — | — | — | — | 70 | — | 70 | 70 | 70 |
| UV absorber | LA-32 | — | — | 3 | 3 | 3 | 3 | 3 | 3 | 3 | 3 | 3 |
| Antioxidant | AO-60 | — | — | 2 | 2 | 2 | 2 | 2 | 2 | 2 | 2 | 2 |
| Water | Ion-exchanged water | *1 | *1 | *1 | *1 | *1 | *1 | *1 | *1 | *1 | *1 | *1 |

*1 Residual

The structures of the aromatic heterocyclic compounds I to VII are as shown below. The aromatic heterocyclic compound I was used as a comparative compound having a molecular weight A of less than 100. The aromatic heterocyclic compound II was used as a comparative compound having a molecular weight A of greater than 1000.

Aromatic heterocyclic compound I

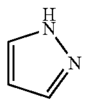

Aromatic heterocyclic compound II

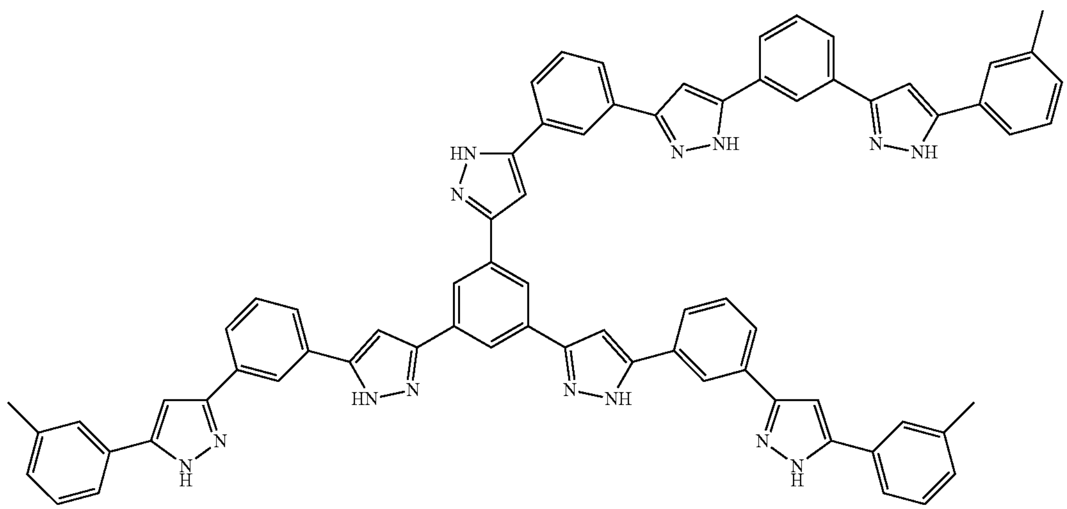

Aromatic heterocyclic compound III

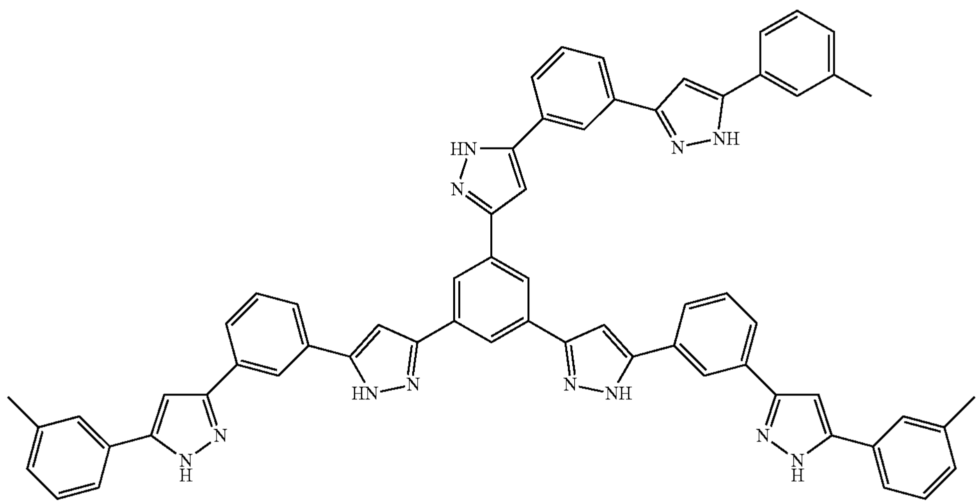

Aromatic heterocyclic compound IV

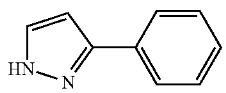

Aromatic heterocyclic compound V

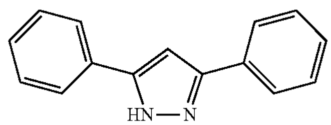

-continued

Aromatic heterocyclic compound VI

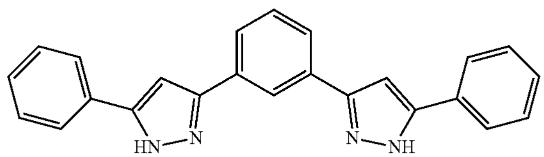

Aromatic heterocyclic compound VII

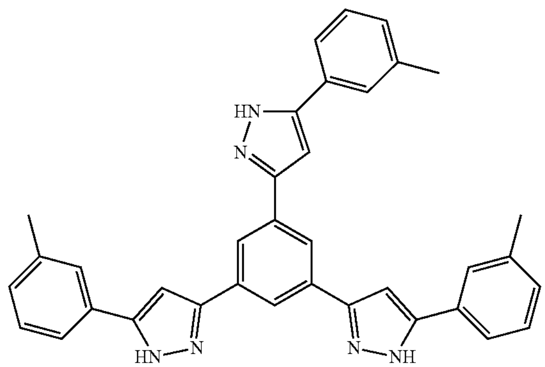

Sodium benzoate contained in the fabric treatment agent 2 was used as a comparative compound which was not an aromatic heterocyclic compound.

Resins, organic solvents, UV absorbers, and antioxidants listed in Table I are as follows.

(Resin)

MD2000 (VYLONAL, polyester resin emulsion, glass transition point Tg: 67° C., number-average molecular weight: $18\times10^3$, resin density: 40% by mass)

(Organic Solvent)

Glycerin (I/O: 5.00)

EG (ethylene glycol, I/O: 5.00)

DPGME (dipropylene glycol monomethyl ether, I/O: 1.00)

DPGDME (dipropylene glycol dimethyl ether, I/O: 0.38)

DMSO (dimethyl sulfoxide, I/O: 1.75)

(UV Absorber)

LA-32 (manufactured by ADEKA Corporation, ADK STAB LA-32, benzotriazole compound) (antioxidant)

AO-60 (manufactured by ADEKA Corporation, ADK STAB AO-60, phenol-based compound)

[Preparation of Textile Printing Ink]

As a dispersing agent, Disperbyk-190 (manufactured by BYK Japan KK, acid value 10 mgKOH/g) and ion-exchanged water were stirred and mixed until uniform. C.I. Disperse Red 60 was then added as a sublimable color material (disperse dye) and premixed. Then, the mixture was dispersed until the Z-average particle diameter to be measured by the dynamic-light-scattering method was in the range of 150 nm or more and 200 nm or less to prepare a dispersion liquid having a sublimable color material density of 20% by mass. At this time, the amounts of the dispersing agent, ion-exchanged water and the sublimable color material were adjusted so that the content of the sublimable color material was 20% by mass with respect to the total mass of the dispersion liquid and the solid content of the dispersing agent was 30% with respect to the total mass of the sublimable color material. The Z-average particle diameter was measured by a dynamic-light-scattering method using Zetasizer 1000 (manufactured by Malvern Panalytical Ltd, "Zetasizer" is a registered trademark of the company) in a sand grinder in which 0.5 mm zirconia beads were filled at a volume ratio of 50%.

The following components were mixed to a total of 100% by mass, and then filtered through a 1 μm mesh filter.

| | |
|---|---|
| Dispersion liquid prepared above | 30% by mass |
| Glycerin | 10% by mass |
| Ethylene glycol | 25% by mass |
| Preservative (PROXEL GXL) | appropriate amount |
| pH modifier (Na citrate hydrate) | appropriate amount |
| Ion-exchanged water | remainder |

As a result, a textile printing ink 1 containing C.I. Disperse Red 60 as a sublimable color material was obtained.

The textile printing ink 2 was obtained in the same manner as the preparation of the textile printing ink 1 except that the sublimable color material was changed to C.I. Disperse Red 4.

The textile printing ink 3 was obtained in the same manner as the preparation of the textile printing ink 1 except that the sublimable color material was changed to C.I. Disperse Red 177.

The textile printing ink 4 was obtained in the same manner as the preparation of the textile printing ink 1 except that the sublimable color material was changed to C.I. Disperse Blue 201.

The textile printing ink 5 was obtained in the same manner as the preparation of the textile printing ink 1 except that the sublimable color material was changed to N, N-Bis (2-cyanoethyl) aniline.

The textile printing ink 6 was obtained in the same manner as the preparation of the textile printing ink 1 except that the sublimable color material was changed to C.I. Disperse Blue 139.

[Textile Printing]

The textile printing was performed using the combination of the fabric treatment agent and the textile printing ink as described in Table II according to the following procedure. In Comparative Example 1, the fabric was not pretreated with the fabric treatment agent.

(1) Pretreatment of Fabric with Fabric Treatment Agent (Preparation of Pretreated Fabric)

A cotton broad 40 (100% cotton) was used as the fabric. Then, the fabric was immersed in a bathtub filled with the fabric treatment agent. The excess fabric treatment agent was then squeezed with a mangle roll at a pick-up rate (percentage of the applied amount of the fabric treatment agent with respect to the mass of the fabric) of 80%. Further, the temperature in the bathtub was in the range of 20° C. or higher and 25° C. or lower.

(2) Application of Textile Printing Ink to Transfer Paper

As the textile printing device, an inkjet printer having an inkjet head "KM1024iMAE" (manufactured by Konica Minolta, Inc) was prepared. Then, a textile printing ink was ejected from a nozzle of the inkjet head to form a solid image on A4 sublimation transfer paper sticky (manufactured by SystemGraphi Co., Ltd.) as the transfer paper. Specifically, an image including thin line grids, gradations, and solid parts (200 mm×200 mm as a whole) were formed in the main-scanning 540 dpi by the sub-scanning 720 dpi. The dpi represents the number of ink droplets (dots) per 2.54 cm. The discharge frequency was 22.4 kHz. Thereafter, the transfer paper to which the textile printing ink was applied was dried in a dryer at a temperature in the range of 50° C. or higher and 80° C. or lower for 30 seconds.

(3) Sublimation Transfer of Textile Printing Ink to Fabric

The transfer paper to which the textile printing ink was applied and the fabric to which the fabric treatment agent was applied were thermocompression bonded using a transfer device (heat pressing device) at 200° C. for 50 seconds with a pressing pressure of 300 g/cm$^2$. As a result, a textile printed fabric was obtained.

TABLE II

| | Fabric treatment agent | | | | | Textile printing ink | | | |
|---|---|---|---|---|---|---|---|---|---|
| | Coloring material capturing compound | | | Organic solvents | | Sublimable color material | | | |
| | No. | Type | Molecular weight A | Type | I/O | No. | Type | Molecular weight B | A + B |
| Comparative Example 1 | — | — | — | — | — | 1 | DR60 | 331 | 331 |
| Comparative Example 2 | 1 | — (Contains resin) | — | Glycerin/EG | 5.00/ 5.00 | 1 | DR60 | 331 | 331 |
| Comparative Example 3 | 2 | Sodium benzoate | 144 | — | — | 1 | DR60 | 331 | 475 |
| Comparative Example 4 | 3 | Aromatic heterocyclic compound I | 68 | DPGME | 1.00 | 2 | DR4 | 269 | 337 |
| Comparative Example 5 | 3 | Aromatic heterocyclic compound I | 68 | DPGME | 1.00 | 1 | DR60 | 331 | 399 |
| Comparative Example 6 | 4 | Aromatic heterocyclic compound II | 1115 | DPGME | 1.00 | 1 | DR60 | 331 | 1446 |
| Comparative Example 7 | 4 | Aromatic heterocyclic compound II | 1115 | DPGME | 1.00 | 3 | DR177 | 438 | 1553 |
| Example 1 | 5 | Aromatic heterocyclic compound III | 973 | DPGME | 1.00 | 3 | DR177 | 438 | 1411 |
| Example 2 | 5 | Aromatic heterocyclic compound III | 973 | DPGME | 1.00 | 4 | DB201 | 533 | 1506 |
| Example 3 | 6 | Aromatic heterocyclic compound IV | 144 | DPGDME | 0.38 | 1 | DR60 | 331 | 475 |
| Example 4 | 7 | Aromatic heterocyclic compound IV | 144 | DMSO | 1.75 | 1 | DR60 | 331 | 475 |
| Example 5 | 8 | Aromatic heterocyclic compound IV | 144 | EG | 5.00 | 1 | DR60 | 331 | 475 |
| Example 6 | 9 | Aromatic heterocyclic compound V | 220 | DMSO | 1.75 | 1 | DR60 | 331 | 551 |
| Example 7 | 10 | Aromatic heterocyclic compound VI | 363 | DMSO | 1.75 | 1 | DR60 | 331 | 694 |
| Example 8 | 11 | Aromatic heterocyclic compound VII | 546 | DMSO | 1.75 | 1 | DR60 | 331 | 877 |
| Example 9 | 6 | Aromatic heterocyclic compound IV | 144 | DPGDME | 0.38 | 5 | N,N-Bis (2-cyanoethyl) aniline | 199 | 343 |
| Example 10 | 6 | Aromatic heterocyclic compound IV | 144 | DPGDME | 0.38 | 1 | DR60 | 331 | 475 |
| Example 11 | 9 | Aromatic heterocyclic compound V | 220 | DMSO | 1.75 | 5 | N,N-Bis (2-cyanoethyl) aniline | 199 | 419 |
| Example 12 | 11 | Aromatic heterocyclic compound VII | 546 | DMSO | 1.75 | 6 | DB139 | 671 | 1217 |

The abbreviations for the sublimable color material in Table II are as follows.

| | |
|---|---|
| DR60 | C.I. Disperse Red 60 |
| DR4 | C.I. Disperse Red 4 |
| DR177 | C.I. Disperse Red 177 |
| DB201 | C.I. Disperse Blue 201 |
| DB139 | C.I. Disperse Blue 139 |

The molecular weight A and the molecular weight B were determined by Gas chromatography time-of-flight mass spectrometry using a sample cut from the textile printed fabric containing the respective components. For the spectrometer, JMS-T2000GC AccuTOF GC-Alpha (High Performance Gas Chromatography Time-of-Flight Mass Spectrometer, manufactured by JEOL Ltd.) was used.

[Evaluation of Color Developing Ability]

L*, a* and b* of the obtained textile printed fabric in the L*a*b* color space were measured by a spectrophotometer (CM-25d manufactured by Konica Minolta, Inc, measuring light source: D65). The color developing ability was evaluated based on the following criteria. Evaluations of A to D are considered to be practically satisfactory.

A: L* is 40 or more and less than 50.
B: L* is 50 or more and less than 60.
C: L* is 60 or more and less than 70.
D: L* is 70 or more and less than 80.
E: L* is 80 or more and less than 90.

[Evaluation of Texture]

The following bending tests were performed on the obtained textile printed fabric.

1) The textile printed fabric was cut into 5 cm×20 cm size to obtain the sample piece 1. Then, as shown in FIG. 1, one of the distal end A of the sample piece 1 in the longitudinal direction and a position B 3 cm away from the end were held between clips of a bending tester KES-FB2-A Pure Bending Tester (Kato Tech Co., Ltd.). Then, the distal end A was rotated with the position B as a base point, and the force (bending torque of the image forming part) required to bend the sample piece 1 in the vicinity of the position B until the curvature was 2.5 cm-1 was measured.

2) Similar tests were also performed on an untreated fabric (sample piece of 5 cm×20 cm) (bending torque of white parts).

3) The difference between the bending torques obtained in 1) and 2) above was calculated.

Then, the foldability was evaluated by the following criteria. Evaluations of A to D are considered to be practically satisfactory.

A: The difference in bending torques is 0.001 gf·cm or less.
B: The difference in bending torques is greater than 0.001 gf·cm and 0.002 gf·cm or less.
C: The difference in bending torques is greater than 0.002 gf·cm and 0.004 gf·cm or less.
D: The difference in bending torques is greater than 0.004 gf·cm and 0.006 gf·cm or less.
E: The difference in bending torques is greater than 0.006 gf·cm.

[Evaluation of Fastness to Washing]

The obtained textile printed fabric was subjected to a washing test in the following procedure.

A multifiber test cloth (F35-8010) cut into 1.5 cm×10 cm size was sewn onto a textile printed fabric cut into 4 cm×20 cm size, and the remaining part of the textile printed fabric was cut.

The sample I sewn with the multifiber test cloth and the remaining sample II after cutting were placed together in a container containing 50 mL of a washing detergent aqueous solution having a concentration of 0.1% by mass (hereinafter referred to as a washing solution). This was fixed in a table-top thermostatic shaking bath and shaken for 30 minutes at 50° C. and 160 rpm. The multifiber test cloth was removed from the sample I taken out from the washing solution, and dried at room temperature for 1 day.

L*, a* and b* of the nylon part of the multifiber test cloth in the L* a* b* color space before and after the washing test were measured by a spectrophotometer "CM-25d" (manufactured by Konica Minolta, Inc, measuring light source: D65). ΔL*, Δa* and Δb*, which are the differences between the respective values before and after the washing test, were obtained, and further, the color difference ΔE*ab was calculated by the following equation. Then, the fastness to washing was evaluated based on the following criteria. Evaluations of A to D are considered to be practically satisfactory.

$$\Delta E^*ab = \{(\Delta L^*)^2 + (\Delta a^*)^2 + (\Delta b^*)^2\}^{1/2} \quad \text{(Equation)}$$

A: ΔE*ab is less than 10.
B: ΔE*ab is 10 or more and less than 15.
C: ΔE*ab is 15 or more and less than 20.
D: ΔE*ab is 20 or more and less than 25.
E: ΔE*ab is 25 or more and less than 30.

[Evaluation of Ironing Resistance]

One piece of white cotton cloth was placed on the hot press table, and a textile printed fabric was placed on it. Furthermore, an electric iron heated to 200° C. in advance was placed thereon, and pressure was applied for 15 seconds. This is used as an ironing resistance test.

L*, a* and b* of the white cotton cloth in the L*a*b* color space before and after the ironing resistance test were measured by a spectrophotometer "CM-25d" (manufactured by Konica Minolta, Inc, measuring light source: D65). ΔL*, Δa* and Δb*, which are the differences between the respective values before and after the ironing resistance test, were obtained, and further, the color difference ΔE*ab was calculated by the following equation. Then, the ironing resistance was evaluated based on the following criteria. Evaluations of A to D are considered to be practically satisfactory.

$$\Delta E^*ab = \{(\Delta L^*)^2 + (\Delta a^*)^2 + (\Delta b^*)^2\}^{1/2} \quad \text{(Equation)}$$

A: ΔE*ab is less than 10.
B: ΔE*ab is 10 or more and less than 15.
C: ΔE*ab is 15 or more and less than 20.
D: ΔE*ab is 20 or more and less than 25.
E: ΔE*ab is 25 or more and less than 30.

TABLE III

| | Evaluation | | | |
|---|---|---|---|---|
| | Color developing ability | Texture | Fastness to washing | Ironing resistance |
| Comparative Example 1 | E | A | E | E |

TABLE III-continued

| | Evaluation | | | |
|---|---|---|---|---|
| | Color developing ability | Texture | Fastness to washing | Ironing resistance |
| Comparative Example 2 | A | E | E | E |
| Comparative Example 3 | D | A | E | E |
| Comparative Example 4 | B | A | E | E |
| Comparative Example 5 | B | A | E | E |
| Comparative Example 6 | E | E | B | B |
| Comparative Example 7 | E | E | B | B |
| Example 1 | C | C | B | B |
| Example 2 | D | D | B | B |
| Example 3 | C | A | C | C |
| Example 4 | A | A | B | C |
| Example 5 | C | A | C | C |
| Example 6 | A | B | B | B |
| Example 7 | B | B | B | B |
| Example 8 | B | B | A | A |
| Example 9 | A | A | C | C |
| Example 10 | A | A | B | C |
| Example 11 | A | B | B | C |
| Example 12 | C | C | A | A |

From the above, it can be confirmed that the fabric treatment agent of the present invention is capable of achieving a high level of color developing ability, texture, fastness to washing, and ironing resistance of the textile printed fabric than that of the fabric treatment agent of the comparative example.

The mechanism of expression or action of the effects of the present invention has not been clarified, but it is presumed as follows.

The use of a fabric treatment agent including an aromatic heterocyclic compound facilitates the introduction of the sublimable color material into the fibers of the fabric. In addition, since the aromatic heterocyclic compound captures the sublimable color material in the fiber, the color developing density of the fabric is significantly improved as compared with the case where the fabric treatment agent is not used. In addition, a method using a resin-dyeable layer conventionally employed in textile printing by sublimation transfer deteriorates the texture of a fabric. On the other hand, the present invention does not require a resin, and therefore it is possible to achieve both color developing ability and texture of the fabric.

From the viewpoint of achieving both the color developing ability and the texture of the fabric at a higher level, the molecular weight A of the aromatic heterocyclic compound is preferably appropriately small. Specifically, when the molecular weight A of the aromatic heterocyclic compound is 1000 or less, both the color developing ability and the texture of the fabric can be achieved at a high level. When the molecular weight A of the aromatic heterocyclic compound is greater than 1000, the aromatic heterocyclic compound hardly penetrates into the fiber of the fabric. Therefore, the sublimable color material cannot be introduced into the fiber, and the color developing density of the fabric is not sufficiently improved. In addition, when an aromatic heterocyclic compound having a large molecular weight is present on the surface of the fiber so as to overlap with each other, the texture of the fabric becomes hard. Therefore, when the molecular weight A of the aromatic heterocyclic compound is 1000 or less, the color developing ability and the texture of the fabric can be achieved at a higher level.

An aromatic heterocyclic compound has a structure exhibiting aromaticity and therefore adsorbs by the π-π interaction with a sublimable color material. This action causes the sublimable color material to become captured in the fibers of the fabric via the aromatic heterocyclic compound. In addition, the sublimable color material adsorbed on the aromatic heterocyclic compound has a large apparent molecular weight, and therefore, it is difficult to move, and it is difficult to leak into the washing liquid during washing. That is, the fastness to washing of the fabric is improved. Similarly, when the sublimable color material is adsorbed on the aromatic heterocyclic compound and the apparent molecular weight is large, the molecules are difficult to move when heated, and thus the sublimable color material is difficult to sublime. That is, the ironing resistance of the fabric is improved.

From the viewpoint of achieving a high level of fastness to washing and ironing resistance of the fabric, it is preferable that the molecular weight A of the aromatic heterocyclic compound is appropriately large. Specifically, when the molecular weight A of the aromatic heterocyclic compound is 100 or more, the fastness to washing and the ironing resistance of the fabric can be improved to a high level. When the molecular weight A of the aromatic heterocyclic compound is less than 100, a coloring material capturing force is insufficient, and thus the fastness to washing of the fabric cannot be sufficiently improved. Therefore, when the molecular weight A of the aromatic heterocyclic compound is 100 or more, the fastness to washing and the ironing resistance of the fabric can be improved to a high level.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A fabric treatment agent for use in textile printing by a sublimable color material, comprising an aromatic heterocyclic compound selected from the group consisting of formulae 1-13:

Compound (1)

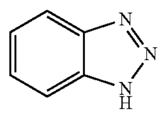

Compound (2)

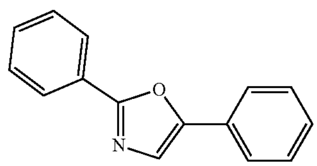

-continued
Compound (3)
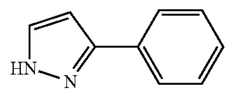
Compound (4)
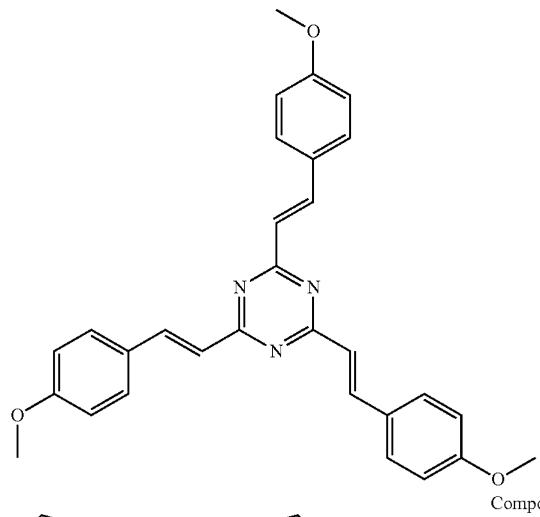
Compound (5)
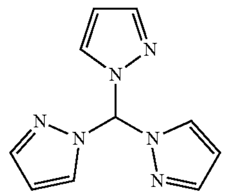
Compound (6)
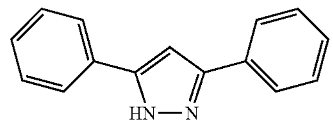
Compound (7)
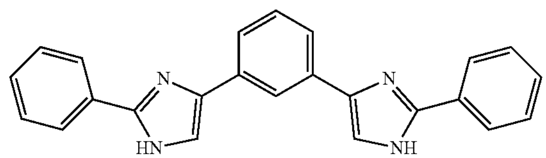
Compound (8)
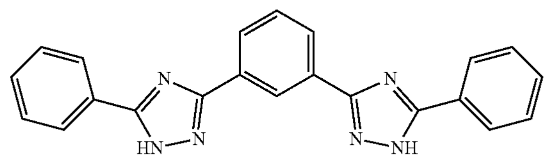
Compound (9)
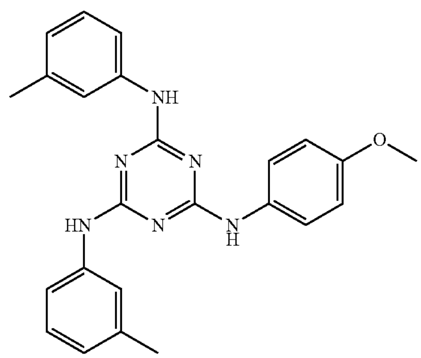
Compound (10)
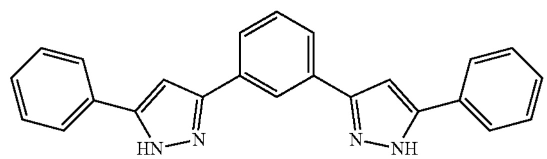
Compound (11)
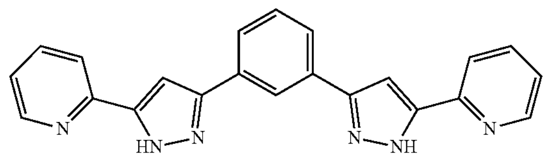
Compound (12)
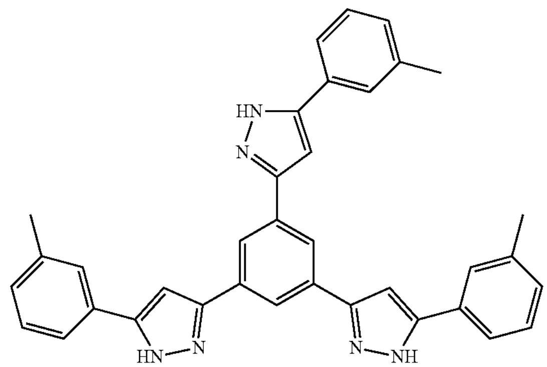

-continued

Compound (13)

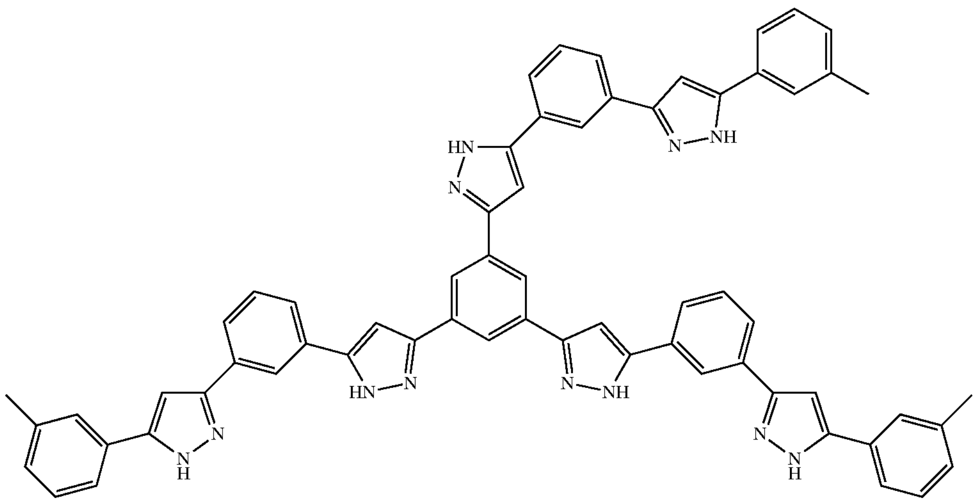

, and wherein a molecular weight A of the aromatic heterocyclic compound satisfies the following relational formula (1):

Relational formula (1): $100 \leq A \leq 1000$.

2. The fabric treatment agent according to claim 1, wherein the molecular weight A of the aromatic heterocyclic compound and a molecular weight B of the sublimable color material satisfy the following relational formula (2):

Relational formula (2): $350 \leq A+B$.

3. The fabric treatment agent according to claim 2, wherein the molecular weight A of the aromatic heterocyclic compound and the molecular weight B of the sublimable color material satisfy the following relational formula (3):

Relational formula (3): $A+B \leq 1500$.

4. The fabric treatment agent according to claim 1, further comprising a solvent having a ratio of an inorganic value of the solvent to an organic value of the solvent (I/O) in the range of 1 or more and 3 or less.

5. The fabric treatment agent according to claim 1, wherein the aromatic heterocyclic compound has 3 or more aromatic rings.

6. The fabric treatment agent according to claim 1, wherein the aromatic heterocyclic compound has 5 or more aromatic rings.

7. The fabric treatment agent according to claim 1, wherein the molecular weight A of the aromatic heterocyclic compound satisfies the following relational formula (1'):

Relational formula (1'): $200 \leq A \leq 600$.

8. The fabric treatment agent according to claim 7, wherein the molecular weight A of the aromatic heterocyclic compound and the molecular weight B of the sublimable color material satisfy the following relational formula (2'):

Relational formula (2'): $450 \leq A+B$.

9. The fabric treatment agent according to claim 8, wherein the molecular weight A of the aromatic heterocyclic compound and the molecular weight B of the sublimable color material satisfy the following relational formula (3'):

Relational formula (3'): $A+B \leq 1200$.

10. A textile printing ink set comprising: a textile printing ink containing a sublimable color material; and a fabric treatment agent, wherein the fabric treatment agent is the fabric treatment agent according to claim 1.

11. A pretreated fabric for use in textile printing by a sublimable color material, comprising an aromatic heterocyclic compound selected from the group consisting of formulae 1-13:

Compound (1)
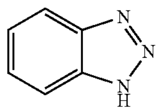
Compound (2)
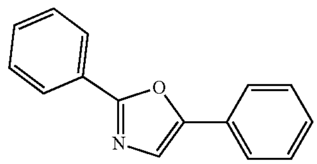
Compound (3)
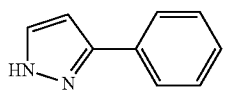
Compound (4)
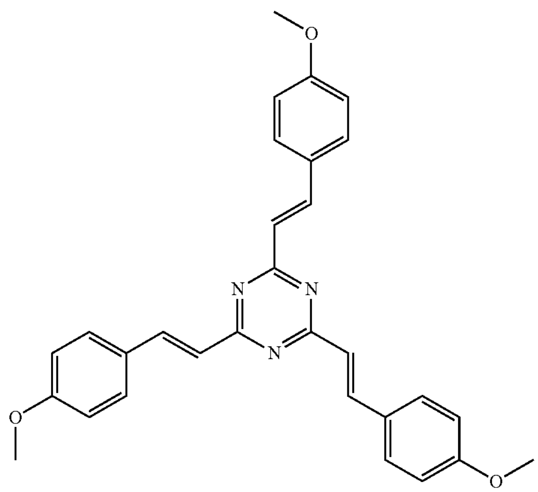
Compound (5)
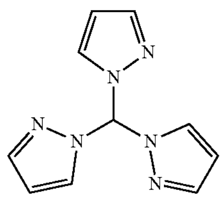
Compound (6)
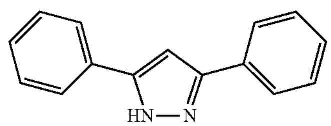
Compound (7)
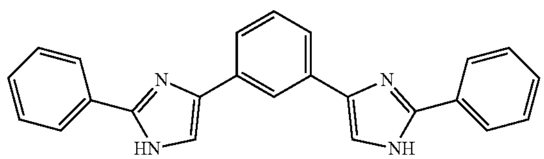
Compound (8)
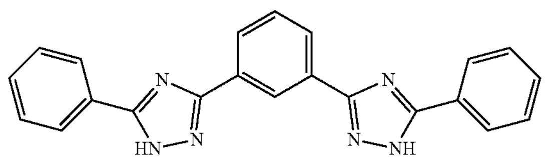
Compound (9)
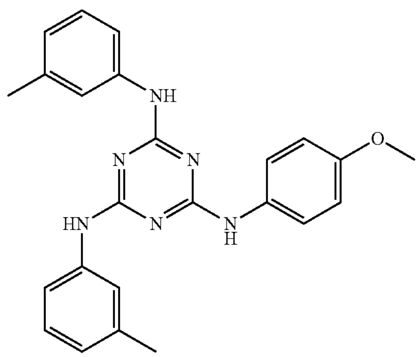
Compound (10)
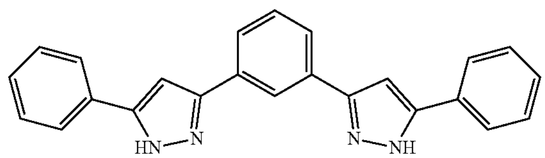

-continued

Compound (11)

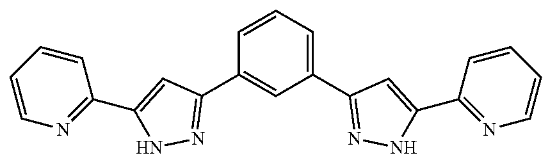

Compound (12)

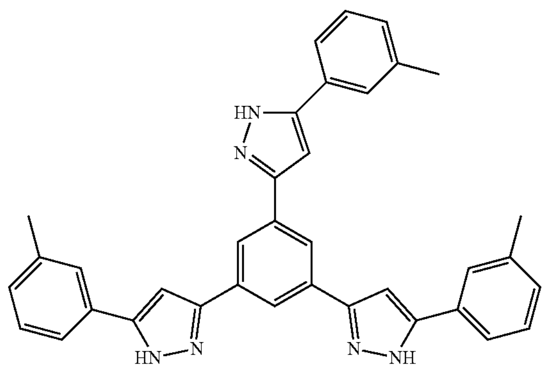

Compound (13)

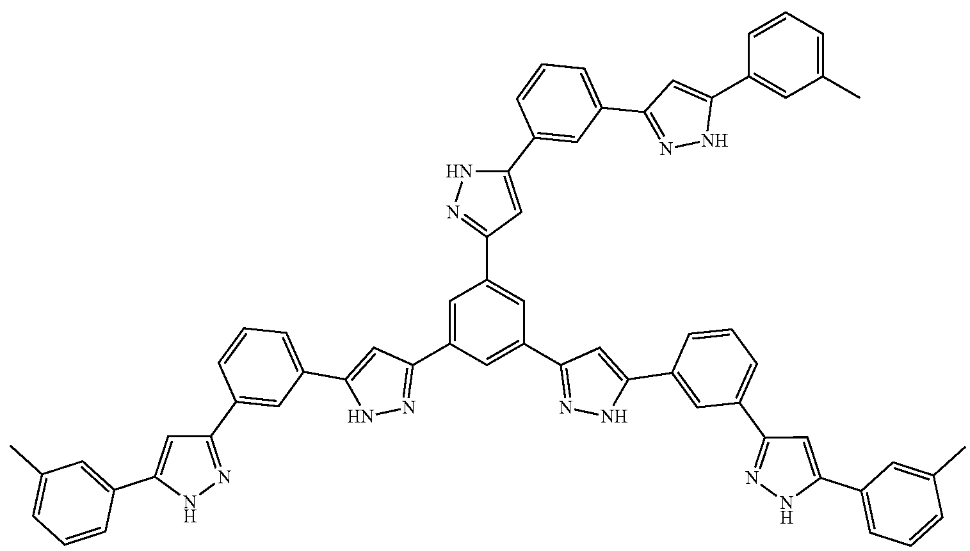

, and wherein a molecular weight A of the aromatic heterocyclic compound satisfies the following relational formula (1):

$100 \le A \le 1000$. Relational formula (1):

12. The pretreated fabric according to claim 11, wherein the molecular weight A of the aromatic heterocyclic compound and a molecular weight B of the sublimable color material satisfy the following relational formula (2):

$350 \le A+B$. Relational formula (2):

13. The pretreated fabric according to claim 12, wherein the molecular weight A of the aromatic heterocyclic compound and the molecular weight B of the sublimable color material satisfy the following relational formula (3):

$A+B \le 1500$. Relational formula (3):

14. A textile printing method comprising, dyeing a fabric with a sublimable color material in the presence of an aromatic heterocyclic compound selected from the group consisting of formulae 1-13:

Compound (1)

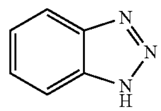

Compound (2)

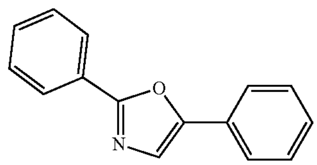

-continued
Compound (3)
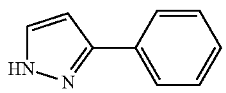
Compound (4)
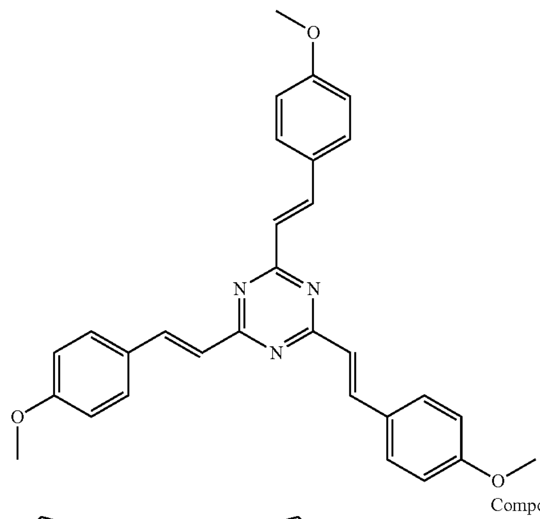
Compound (5)
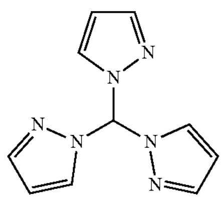
Compound (6)
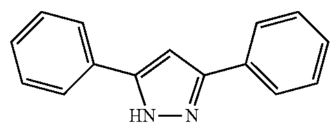
Compound (7)
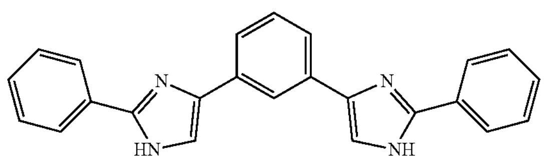
Compound (8)
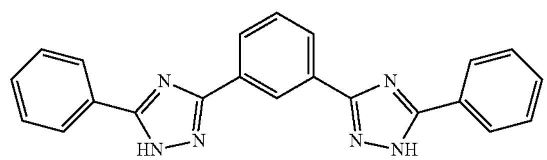
Compound (9)
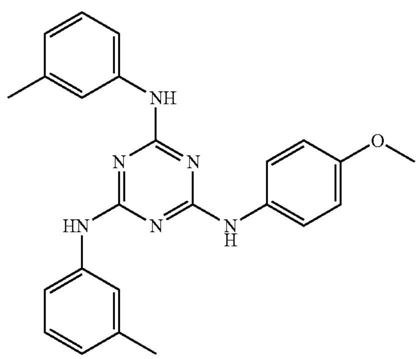
Compound (10)
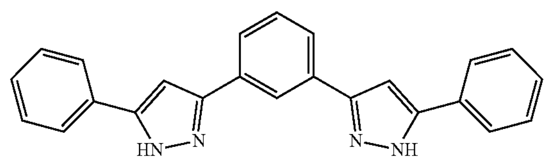
Compound (11)
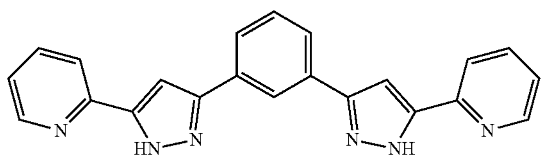
Compound (12)
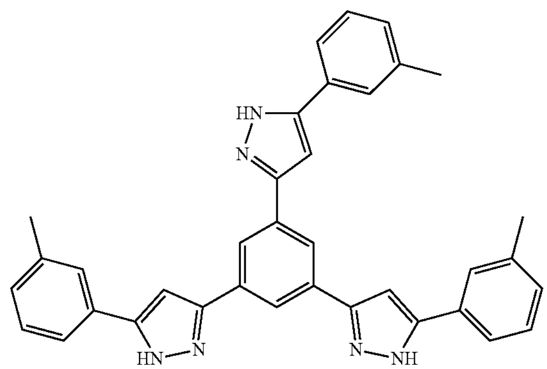

-continued

Compound (13)

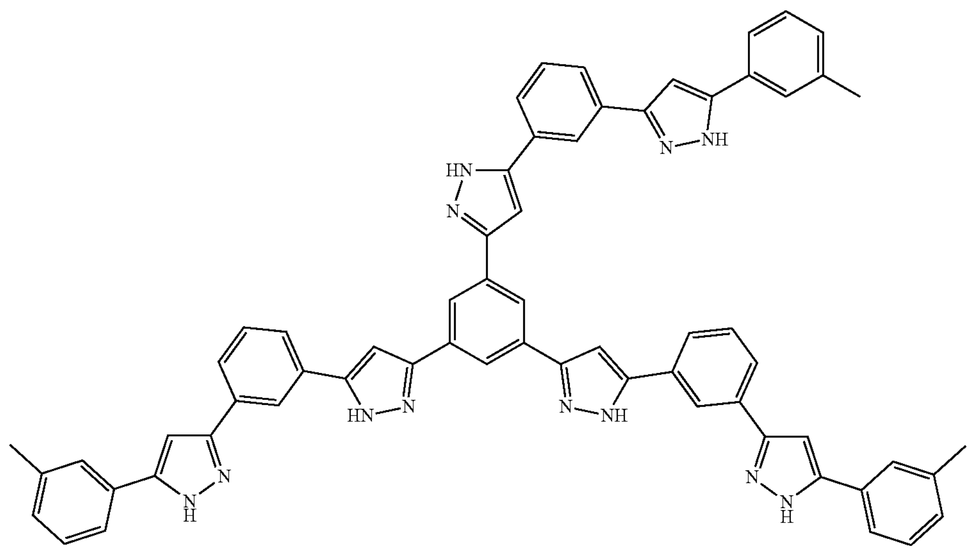

, and wherein a molecular weight A of the aromatic heterocyclic compound satisfies the following relational formula (1):

$100 \leq A \leq 1000$. Relational formula (1):

15. The textile printing method according to claim 14, wherein the molecular weight A of the aromatic heterocyclic compound and a molecular weight B of the sublimable color material satisfy the following relational formula (2):

$350 \leq A+B$. Relational formula (2):

16. The textile printing method according to claim 15, wherein the molecular weight A of the aromatic heterocyclic compound and the molecular weight B of the sublimable color material satisfy the following relational formula (3):

$A+B \leq 1500$. Relational formula (3):

17. The textile printing method according to claim 14, wherein the fabric contains natural fibers or synthetic cellulose fibers.

18. The textile printing method according to claim 14, wherein dyeing is done by a sublimation transfer method.

19. A textile printed fabric comprising an aromatic heterocyclic compound selected from the group consisting of formulae 1-13:

Compoiund (1)

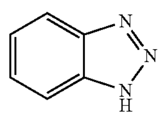

Compoiund (2)

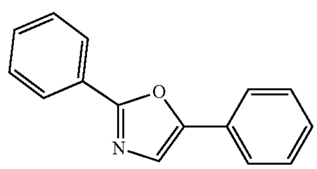

Compoiund (3)

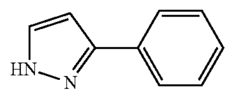

Compoiund (4)

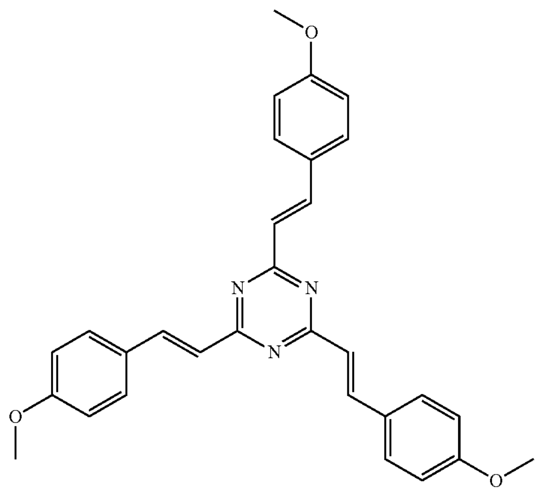

-continued
Compoiund (5)
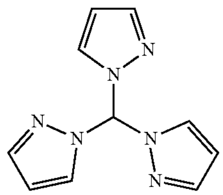
Compoiund (6)
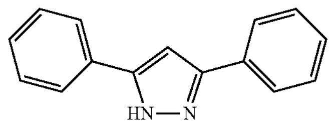
Compoiund (7)
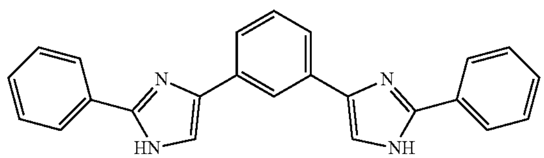
Compoiund (8)
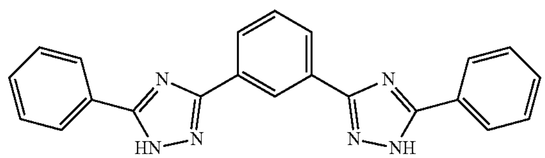
Compound (9)
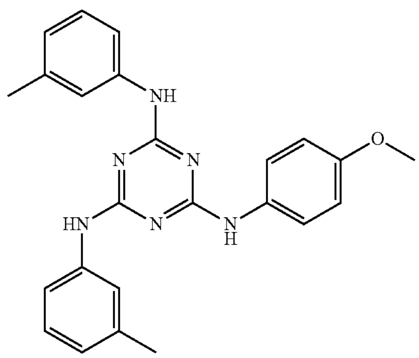
Compound (10)
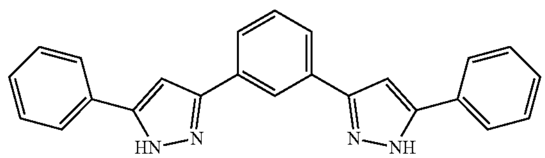
Compound (11)
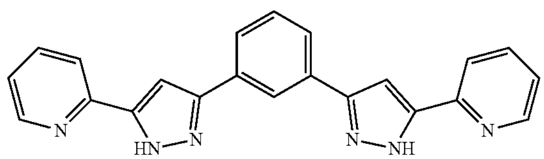
Compound (12)
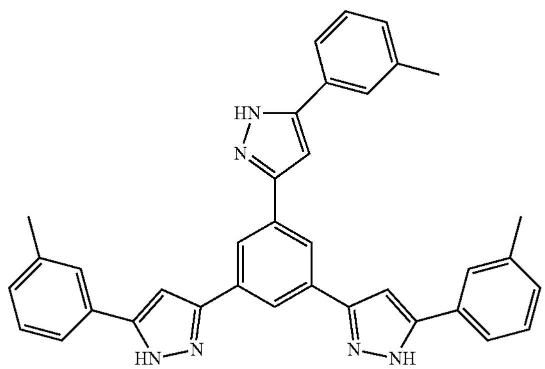

-continued

Compound (13)

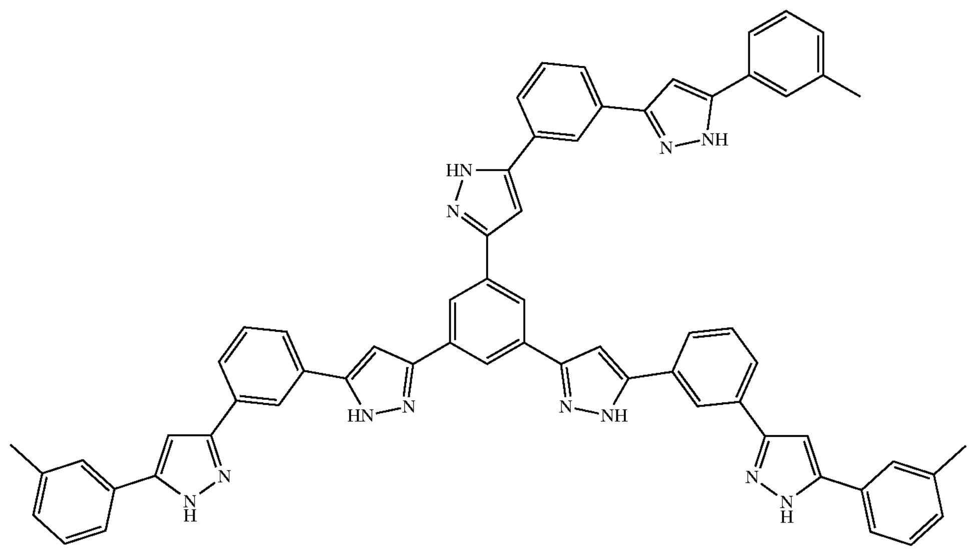

and a sublimable color material, wherein a molecular weight A of the aromatic heterocyclic compound satisfies the following relational formula (1):

Relational formula (1): $100 \leq A \leq 4000$.

20. The textile printed fabric according to claim 19, wherein the molecular weight A of the aromatic heterocyclic compound and a molecular weight B of the sublimable color material satisfy the following relational formula (2):

Relational formula (2): $350 \leq A+B$.

21. The textile printed fabric according to claim 20, wherein the molecular weight A of the aromatic heterocyclic compound and the molecular weight B of the sublimable color material satisfy the following relational formula (3):

Relational formula (3): $A+B<1500$.

* * * * *